US011186367B2

(12) United States Patent
Suppes

(10) Patent No.: US 11,186,367 B2
(45) Date of Patent: Nov. 30, 2021

(54) MULTICOPTER WITH IMPROVED FAILSAFE OPERATION

(71) Applicant: Galen Suppes, Columbia, MO (US)

(72) Inventor: Galen Suppes, Columbia, MO (US)

(73) Assignee: The Suppes Family Trust, Columbia, MO (US)

( * ) Notice: Subject to any disclaimer, the term of this patent is extended or adjusted under 35 U.S.C. 154(b) by 80 days.

(21) Appl. No.: 16/783,319

(22) Filed: Feb. 6, 2020

(65) Prior Publication Data

US 2020/0255128 A1 Aug. 13, 2020

Related U.S. Application Data

(60) Provisional application No. 62/879,003, filed on Jul. 26, 2019, provisional application No. 62/862,237, filed on Jun. 17, 2019, provisional application No. 62/860,152, filed on Jun. 11, 2019, provisional application No. 62/944,506, filed on Dec. 6, 2019.

(51) Int. Cl.
*B64C 39/02* (2006.01)
*B64C 29/00* (2006.01)
*B64D 27/24* (2006.01)

(52) U.S. Cl.
CPC ........ *B64C 39/024* (2013.01); *B64C 29/0033* (2013.01); *B64D 27/24* (2013.01); *B64C 2201/104* (2013.01); *B64C 2201/108* (2013.01)

(58) Field of Classification Search
CPC .............................. B64C 27/28; B64C 29/0033
See application file for complete search history.

(56) References Cited

U.S. PATENT DOCUMENTS

| | | | | |
|---|---|---|---|---|
| 1,783,458 A * | 12/1930 | Windsor | ............. | B64C 29/0033 244/6 |
| 2,448,392 A * | 8/1948 | Quady | ................ | B64C 29/0033 244/7 R |
| 2,936,967 A * | 5/1960 | Dancik | ............... | B64C 29/0033 244/7 C |
| 2,936,968 A * | 5/1960 | Mazzitelli | ........... | B64C 29/0033 244/7 C |
| 3,136,499 A * | 6/1964 | Kessler | ............... | B64C 29/0033 244/7 C |
| 3,141,633 A * | 7/1964 | Mackay | .............. | B64C 29/0033 244/7 C |
| 4,149,688 A * | 4/1979 | Miller, Jr. | ........... | B64C 29/0033 244/12.4 |
| 4,899,957 A | 2/1990 | Eickmann | | |

(Continued)

FOREIGN PATENT DOCUMENTS

| | | | | |
|---|---|---|---|---|
| CN | 109250097 A * | 1/2019 | ............. | B64C 27/26 |
| EP | 2690012 A1 * | 1/2014 | ............. | B64C 27/26 |
| WO | WO-2015089679 A1 * | 6/2015 | ............. | B64C 27/16 |

OTHER PUBLICATIONS

Suppes, G.J.Al-Moameri., H. 3D Prototyping: and Manufacturing—Urethane Enhancement and New Applications, CPI Conference (2019) Paper 47, Orlando, FL, Oct. 7-9, 2019.

(Continued)

*Primary Examiner* — Joseph W Sanderson

(57) ABSTRACT

Transitioning multicopters use front tiltwings to provide improved failsafe methods of landing in event of propulsor failure. A dicopter version provides for efficient use of two propulsors with multiple modes of failsafe landing.

20 Claims, 9 Drawing Sheets

(56) References Cited

U.S. PATENT DOCUMENTS

| | | |
|---|---|---|
| 6,783,096 B2 | 8/2004 | Baldwin |
| 7,059,562 B2 | 6/2006 | Baldwin |
| 7,665,688 B2 * | 2/2010 | Cylinder ............... B64C 39/024 |
| | | 244/7 A |
| 10,011,349 B2 | 7/2018 | Ivans et al. |
| 10,106,253 B2 * | 10/2018 | Groninga ................ B64C 27/28 |
| 10,173,771 B2 | 1/2019 | Ivans et al. |
| 10,266,252 B2 | 4/2019 | Anderson et al. |
| 10,279,892 B2 | 5/2019 | Bosworth |
| 10,351,235 B2 | 7/2019 | Karem et al. |
| 10,370,100 B2 | 8/2019 | Rothhaar et al. |
| 10,392,107 B2 * | 8/2019 | Har ...................... B64C 39/024 |
| 10,518,873 B2 * | 12/2019 | Netzer ................ B64C 29/0083 |
| 10,589,838 B1 * | 3/2020 | Suppes ................. B64C 27/001 |
| 10,597,152 B2 * | 3/2020 | Groninga ............. B64C 39/008 |
| 2009/0014599 A1 * | 1/2009 | Cylinder ................ B64C 27/24 |
| | | 244/7 R |
| 2017/0057630 A1 * | 3/2017 | Schwaiger ............. B64D 27/04 |
| 2018/0057157 A1 * | 3/2018 | Groninga ............... B64C 39/008 |
| 2018/0178910 A1 * | 6/2018 | Har ........................... B64C 5/02 |
| 2018/0215465 A1 * | 8/2018 | Renteria ................. B64C 27/28 |
| 2018/0370625 A1 * | 12/2018 | Netzer ................... B64D 47/08 |
| 2019/0031333 A1 * | 1/2019 | Groninga ............ B64C 29/0033 |
| 2019/0241260 A1 * | 8/2019 | Alhussan ............... B64D 35/04 |
| 2019/0291859 A1 * | 9/2019 | Manning ............... B64C 39/026 |
| 2020/0010182 A1 * | 1/2020 | Renteria ................ A63H 27/02 |
| 2020/0086971 A1 * | 3/2020 | Heeringa ............ B64C 29/0033 |
| 2020/0391859 A1 * | 12/2020 | Groninga ............. B64C 11/001 |

OTHER PUBLICATIONS

Unpublished Patent, Suppes, G.J., U.S. Appl. No. 16/565,775, Multicopter with Passively-Adjusting Tiltwing, patent granted Jan. 2020. Not yet published.

* cited by examiner

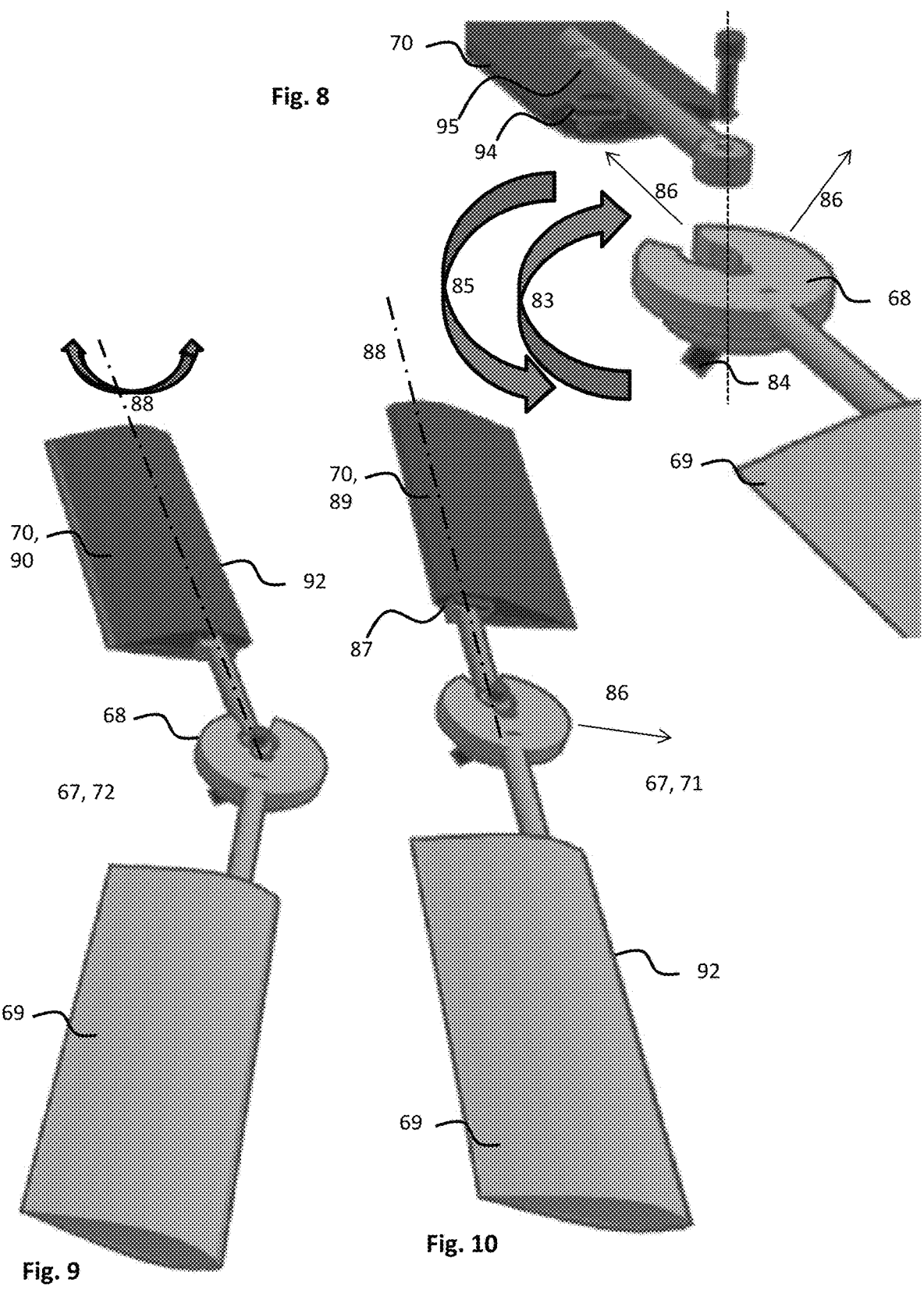

MULTICOPTER WITH IMPROVED FAILSAFE OPERATION

CROSS REFERENCE TO RELATED APPLICATIONS

This application is a continuation-in-part of Provisional Applications Ser. No. 62/944,506 filed Dec. 6, 2019 entitled "Multicopter with Passively-Adjusting Tiltwing", Ser. No. 62/879,003 filed Jul. 26, 2019 entitled "Passively-Adjusting Tiltwing", Ser. No. 62/862,237 filed Jun. 17, 2019 entitled "High Speed Drone", and Ser. No. 62/860,152 filed Jun. 11, 2019 entitled "High Speed Drone". All of the above-listed applications are incorporated by reference in their entirety herein.

FIELD

The present invention relates to vertical takeoff and landing aerial vehicles capable of transitioning to the equivalent of fixed-wing flight. More specifically this invention relates to multicopters with improved failsafe operation through use of a front tiltwing.

BACKGROUND

This invention is a vertical takeoff aerial vehicle with significantly improved energy efficiency as compared to other vertical takeoff aerial vehicles. Benefits include lower cost vehicles, passive flight stability features, and reduced energy consumption.

Low cruising energy efficiency is a problem of alternative vertical takeoff and landing (VTOL) aerial vehicles. Confinement to takeoff and landing is a problem with most fixed-wing aircraft.

Related art includes such items as "freewings" which are typically wings that freely rotate along a spanwise axis and "tiltwings" which are typically wings with propellers or jets attached and are typically controlled in position by actuators. Preferred tiltwings of the claims of this invention are passively controlled rather than actively controlled with actuators—often, passively controlled includes indirectly controlling such as using a propeller to change vehicle velocity relative to air wherein the relative velocity of air controls tiltwing position.

A tiltwing has both a thrust vector and lift-generating wing-like surfaces. Tiltwings of this invention are single tiltwings in front of a single fuselage.

Baldwin (U.S. Pat. No. 7,059,562) describes: "A flying craft comprising: (a) a suspension structure having a first end and a second end; (b) a lift unit coupled to the first end of the suspension structure including: (1) at least one pair of torque producing propulsion systems including counter-rotating propellers, (2) wherein the lift unit is freely rotatable, within a predetermined angular range about only one rotational axis perpendicular to an axis passing through the first and second ends of the suspension structure." Also, Baldwin identifies, "Pitch control surface 280, in combination with the energized airflow for torque-production propulsion subsystems 252 and 256 having propellers 254 and 258, provides sufficient pitch authority to transition lift unit 204 between vertical and horizontal flight."

SUMMARY OF THE INVENTION

HS-Drone (name of this invention embodiment) is a transition VTOL wherein a number of forces on a tiltwing cause the tiltwing to transition from vertical thrust to a thrust having a greater forward component. Examples of torques acting on a tiltwing include torques from the center of gravity (CG), from aerodynamic forces, and from a thruster motor (hereafter, "thruster") that has a thrust vector that does not go through the tiltwing's axis of rotation.

The pitch and respective thrust vector of the tiltwings of the embodiments of this invention are Passively-adjusting such that increasing velocity leads to more-horizontal thrust vectors (up to points of diminishing returns). The pitch of the fuselage is actively controlled by a number of methods, the most common of which is the rotational speed of the thruster (or thrusters) on the fuselage relative to the rotational speed of the thruster (or thrustmotors) on the tiltwing. In this document and associated claims, thrusters are primary propulsion means as compared to much literature where thrusters are secondary propulsion means.

A feature that distinguishes the embodiments of this invention from most multicopters is a front tiltwing (including at least one tiltwing propulsor) that can operate to land safely in the event of failure of all other propulsors.

BRIEF DESCRIPTION OF THE DRAWINGS

FIG. 8 is an illustration of passively transforming rotary wing with passive twisting axis in radial direction and angular pivot to form a swept wing.

FIG. 9 is an illustration of the FIG. 8 rotary wing component in a rotary wing position.

FIG. 10 is an illustration of the FIG. 8 rotary wing components in a swept fix wing position.

DEFINITIONS SPECIFIC TO THIS DOCUMENT

Figure 1:
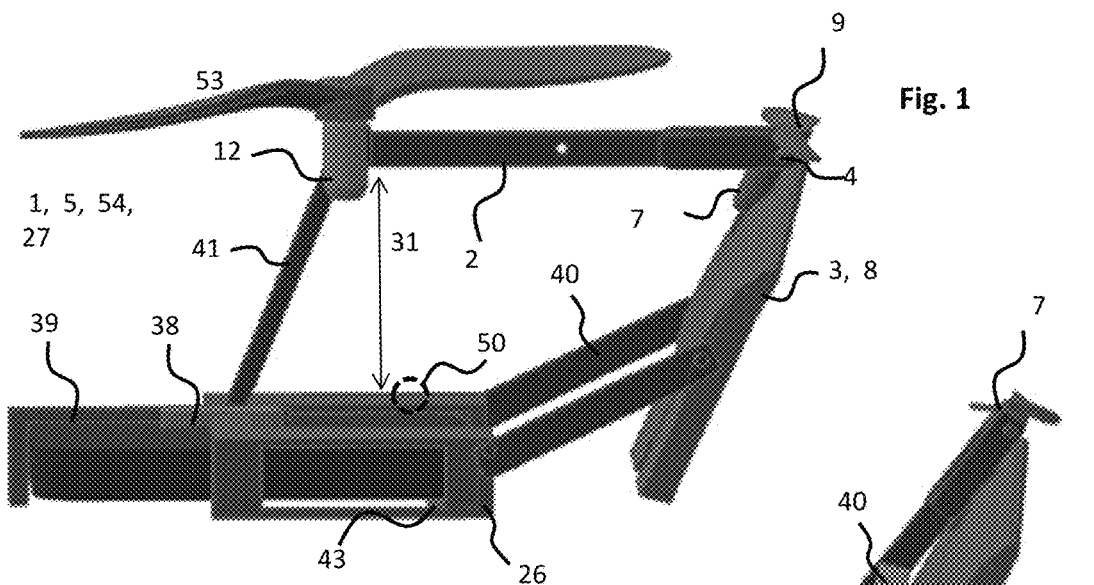
FIG. 1 is an illustration of a dicopter version of a multicopter in VTOL position with a swaywing fuselage compartment.

Some definitions used in this document are:

Airchassis—the chassis analog of an aircraft, the airchassis does not include the cabin, shell, and wings.

Blade—wing sections of a rotary wing, typically two blades per rotary wing in embodiments of this invention.

Cruising—term associated with flight where the propulsor thrust is more horizontal than vertical.

Failsafe configuration—a default configuration of a multicopter that is assumed through passive actuation and conducive to landing without catastrophic damage (e.g. a survivable hard landing).

Forward, Aft, Port, Starboard, Leading Edge, and Nose—terms as commonly used in navel ship arts.

Freewing—a tiltwing without a propulsor.

Fuselage Compartment—a cabin or storage area including at least partial containment by walls or restraints like netting.

Lateral-Axis Bearing—a bearing having an axial center of rotation in the spanwise direction.

Lifting-Body Surface—a surface either below or above a fuselage compartment, or contents of a fuselage compartment (e.g. if a box is in the fuselage compartment) that generates aerodynamic lift and has at least one configuration where the median angle of attack of air on the surface is between 0 and 10 degrees (where positive degrees is nose up consistent with definition of "positive pitch").

Liftpath—an aerodynamic path on the upper or lower surface(s) of an object or plurality of objects connected in a somewhat continuous path; wherein, aerodynamic lift is caused by the interaction of air with the surface(s).

Longitudinal—dimension from nose to tail when in horizontal position, lateral is spanwise.

Low Voltage—a voltage lower than voltages typically used to transfer electric power to devices more than a few feet distant.

Moderate Voltage—is a voltage consistent with transfer of electrical power to devices more than a few feet distant. Here, common AC voltages are 110 VAC and 220 VAC and common DC voltages are typically greater than 4 volts.

Pitch Angle of a Surface—unless otherwise stated, is a median angle of a surface having a range of angles where the angle of a point on the surface is the angle of a line in the vertical-lateral plane and tangent to the surface where zero corresponds to horizontal and more positive is more nose upward.

Propulsor—a device providing thrust for propulsion using fuel or electricity including but not limited to prop engines/motors, turbine engines, and rotary blades.

Psuedo-Autorotation—sort of like autorotation, but whereas autorotation relies on a swashplate-actuated last-minute conversion of kinetic rotary blade energy into rotary-wing lift in a mode without motor/engine power, pseudo-autorotation uses a simple rotary wing (no swashplate) and relies on control of power to the wing to create increased lift immediately before landing.

Rotary Wing—a propeller designed to have relatively low angles of attack to generate more-favorable lift-to-drag rations from its rotation; commonly used on helicopters as the primary source of lift.

Swaywing—a fuselage compartment at least substantially below an airchassis and where aerodynamic forces assist in moving aft and upward in a transition from hovering to cruising. A freewing is considered to be a type of a swaywing when the freewing includes the primary cabin/compartment of the multicopter.

Tiltwing—a wing with at least one propulsor where the wing is pivotally connected to an arm or airchassis and configured to rotate through a range of pitch angles typically from about 90 degrees to 0 degrees pitch.

VTOL—vertical takeoff and landing.

DESCRIPTION OF INVENTION

FIG. 1 illustrates a multicopter 1 comprising a multicopter airchassis 2; a forward tilting body 3 pivotably connected [bearing 4] to the airchassis 2 and configured to pivot between a first position 5 associated with a hover flight mode and a second position 6 associated with a forward flight mode a forward propulsor 7 coupled to the front tiltwing 8; wherein the forward propulsor 7 is configured to aerodynamically actuate through a range of motion along with the forward tilting body 3 due to aerodynamics about the front tiltwing 8 and wherein the forward propulsor 7 is configured for failsafe operation[hard/soft landing 10, runway landing configuration 11] to vertically land the multicopter 2 without thrust from other propulsors such as a midsection propulsor 12 or second forward propulsor 13.

Figure 2:
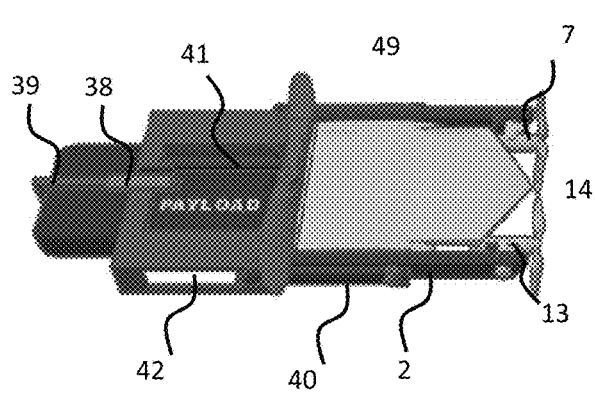
FIG. 2 is an illustration of a dicopter version of a multicopter in cruising position.

A further embodiment of the multicopter 1 comprises a second forward propulsor 13 coupled to the forward tilting 8 (see FIG. 2) wherein the forward propulsor 7 and the second forward propulsor 13 comprise a twin engine configuration 14 on the front tiltwing 8.

Figure 3:
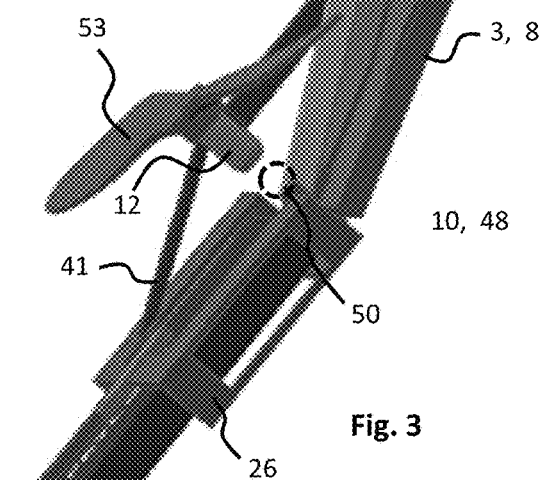
FIG. 3 is an illustration of a dicopter version of a multicopter in failsafe pseudo autorotation using a front propulsor.
Figure 4:
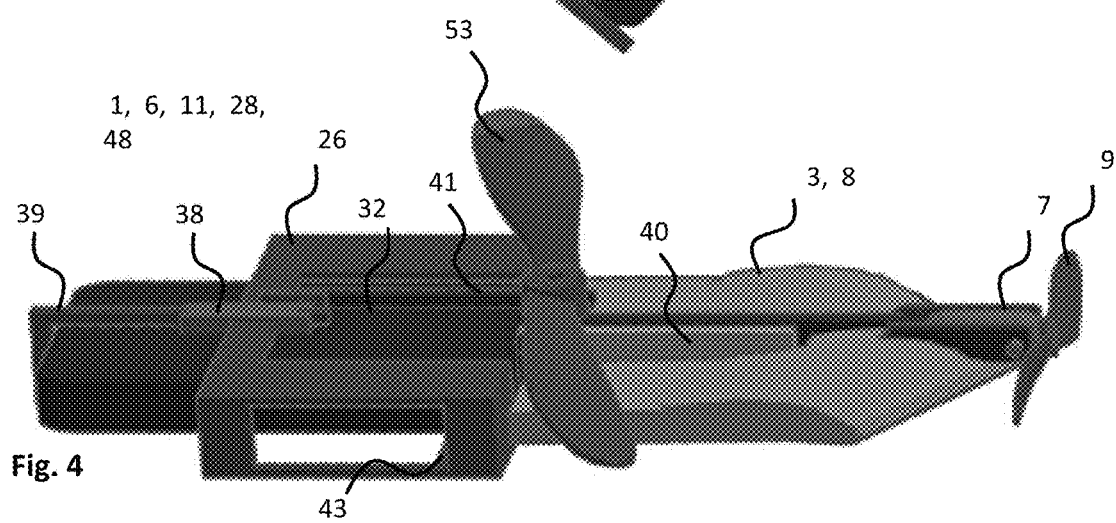
FIG. 4 is an illustration of a dicopter version of a multicopter in cruising position with single truss airchassis.
Figure 5:
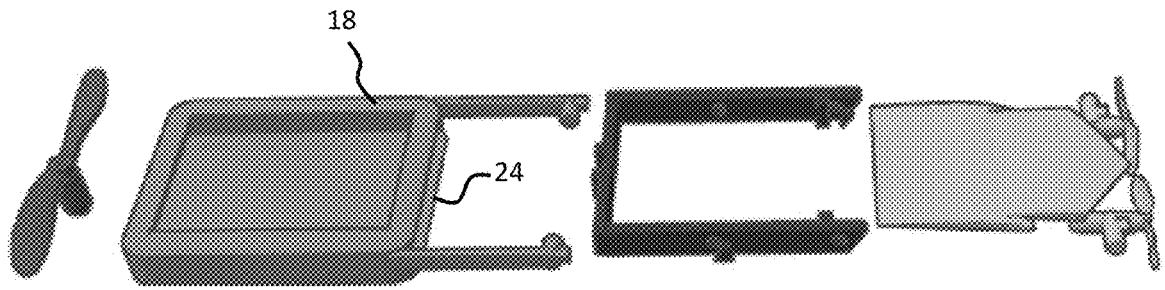
FIG. 5 is an illustration of parts of a tricopter version of a multicopter.
Figure 6:
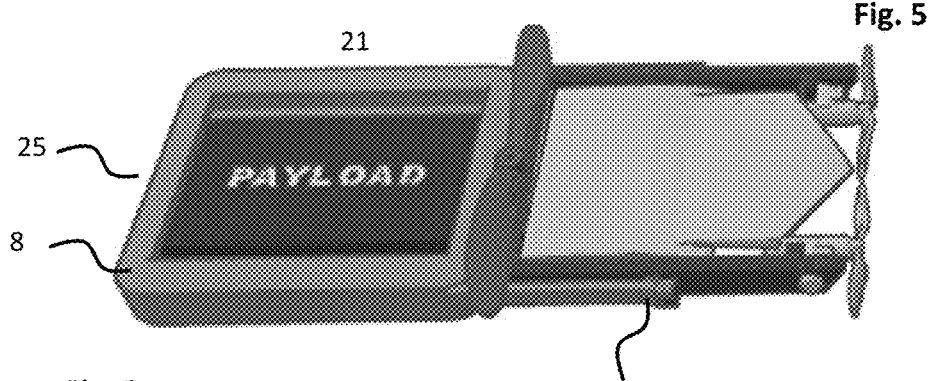
FIG. 6 is an illustration of a tricopter version of a multicopter in cruising position with a freewing fuselage compartment in a cruising position.

A further embodiment of the failsafe operation is wherein the forward propulsor 7 is engaged to provide additional upward thrust in a hard landing configuration 10 within the last ten seconds of decent. FIG. 3 illustrates a failsafe configuration with mostly upward thrust but some forward thrust.

A further embodiment of the failsafe operation is wherein the forward propulsor 7 is engaged to provide additional upward thrust in a hard landing configuration 10 within the last ten seconds of decent. Delayed application of additional thrust can avoid rolling the multicopter if the upward thrust is too distant from the vehicle center of gravity. Preferably, the multicopter comprises a midsection propulsor 12 coupled to the multicopter airchassis 2.

Further preferred embodiments are a) wherein the midsection propulsor 12 is configured for failsafe operation to vertically land [midsection blade hard landing configuration 14] the multicopter without thrust from other propulsors, b) wherein the midsection propulsor 12 is engaged to provide additional vertical thrust in a hard landing configuration 14 within the last ten seconds of decent, and c) wherein a coupling connects the midsection propulsor 12 to the multicopter airchassis 2 in a range of orientations 15 wherein the coupling is configured for pendular forces 16 to bias the orientation 15 of the midsection propulsor 12.

Also: Additional propulsors 17 may be added aft the midsection propulsor 12. A fuselage compartment freewing 18 may be configured to pivot (e.g. bearing 19) between a first position 20 associated with a hover flight mode and a second position 21 associated with a forward flight mode said freewing 18 configured to aerodynamically actuate through a range of motion due to aerodynamics about the freewing 18 said freewing further configured [lower surface 22, upper surface 23] to provide aerodynamic lift.

The fuselage compartment freewing 18 may comprise a payload entrance 24 at the front of the fuselage compartment freewing 18 and a payload exit 25 at the rear of the fuselage compartment freewing 18.

An alternative payload compartment is a swaywing that stays substantially level in the transition from hovering to cruising (see FIGS. 1-4); the swaywing is configured to swing from a first position 27 associated with a hover flight mode and a second position 28 associated with a forward flight mode. Preferably, said swaywing 26 is configured to aerodynamically actuate through a range of motion due to aerodynamics about the swaywing said swaywing further configured to provide aerodynamic lift (lower surface 22, upper surface 23), and further, is comprised of two longitudinally displaced spanwise axes of rotation on the fuselage compartment swaywing wherein the pitch 29 of the swaywing 26 relative to the multicopter airchassis 2 varies from about 0 to 20 degrees (more preferably, 1 to 5 degrees).

The preferred swaywing multicopter comprises a midsection rotary blade downwash 30 wherein the swaywing first position 27 is displaced below the airchassis with a vertical gap 31 for downwash 30 air flow and the swaywing second position 28 is adjacent to the airchassis with a reduced gap 32 for downwash 30 air flow. Optionally, a swaywing deflection surface 33 said deflection surface deflecting at least part of the rotary blade downwash 30 rearward. This configurations assists with initiating forward velocity.

The multicopter airchassis may comprise two longitudinally extending trusses 34, multiple propulsors 35 coupled to the longitudinally extending trusses 34, and a fuselage compartment walking path 36 located between and below the two longitudinally extending trusses 34. This provides for a walking path that can go higher into the airchassis for a cruising position with lower form drag.

A further embodiment comprises a multicopter center of gravity, a midsection propulsor, a midsection propulsor propeller said propellor having a disc-shaped area of rotation wherein the area of rotation located above the multicopter center of gravity. This configuration enables failsafe modes of operation based on landing with only a midsection rotor.

A tiltwing and swaywing/freewing may share a common pivot axis on the airchassis. The front of the swaywing may be connected to either the tiltwing (FIG. 1) or the airchassis (FIG. 3).

If a jet engine is used as a propulsor, preferably a deflection device bends aire at the intake and/or exhaust to vector thrust forces for control or velocity generation. The airchassis may support a jet engine as a front propulsor, a rear propulsor, and/or a propulsor through length of body.

Fixed-wing aircraft of desired shape may be reverse transformed by identifying locations for separating into the tiltwing versus the fuselage compartment (freewing or swaywing) combined with airchassis connectivity.

Failsafe Operation

A preferred dicopter 1 comprises a) a multicopter center of gravity 50, b) a first propulsor 7 said propulsor attached to a surface 3 said surface pivoting freely said pivoting comprised in part of response to a pendular force 51 causing an upward propulsor thrust 52, a midsection propulsor 12, c) a midsection propulsor rotary wing 53 said rotary wing 53 having a disc-shaped area of rotation 46, said area of rotation 46 located above the multicopter center of gravity 50, and d) at least two hard landing configurations 10 54. With descent on a landing site, a first hard landing configuration 10 is wherein the first propulsor 7 is energized with additional upward thrust 52 within two hundred feet above the landing site. A second hard landing configuration 54 is wherein the midsection propulsor 12 is energized with additional upward thrust 55 within two hundred feet above the landing site. The first propulsor 7 and the surface preferably comprise a tiltwing 8.

A rudder 56 in a propulsor downwash 57 may be used to accelerate air in a spanwise direction creating a forward lateral force 59 wherein during a hard landing 10 the controlled lateral force 59 may be controlled to counter roll and/or yaw. The lateral forces may be controlled to position a propulsor over the multicopter center of gravity 50 to enable increased thrust and dampening of decent.

Preferably, the dicopter is comprised of a front tiltwing and a midsection propulsor wherein the midsection propulsor 12 is a rotary wing 53 with an axis of rotation 60. The rotary wing 53 may be mechanically connected to a airchassis in a pendular configuration 61 wherein dampened lateral and longitudinal pendular movement better align the rotary wing axis of rotation 60 to intersect the multicopter center of gravity 50. This allows for greater reduction of (dampening) rate of decent without inducing excessive roll.

A second forward propulsor 13 may be used the first propulsor 7 to comprise a twin engine configuration 14 on a tiltwing 8. Here, accelerating air in the spanwise direction can be used to create a lateral force 59 similar to as previously described. A sensor may be used to assist in identifying the height of the multicopter above a landing location and determine optimal timing to increase upward thrust before landing.

A passive roll control embodiment comprises a midsection propulsor 12, such as a rotary wing 53, a pendular connection 101, and a midsection motor 105 below the pendular connection 101. Here, the weight of the motor 105 may create a pendular movement in the spanwise direction. By example, a the stationary piece 107 such as a socket 102 connected to the airchassis may interact with a pendular piece 106 having a partial sphere surface 103. Alternatively, the pendular connection 101 may be a hinge joint 108 with a longitudinal axis 109 of rotation. These pendular configurations have the purpose of better positioning thrust over the multicopter center of gravity.

FIGS. 15-18 illustrate pivotable and/or pendular connections 101 is an open-socket 102 and ball 103 joint Transition of Rotary Wing to Fixed Wing FIGS. 8-10 illustrate a rotary wing that can transition to a fixed swept wing; that rotary wing 67 comprises a hub 68, first blade 69 extending from the hub, and a second blade 70 extending from the hub in direction opposite the first blade. In the forward flight configuration, the rotary wing is in a non-rotating configuration wherein oncoming air impacts the bottom of the first blade 73 at a median angle of attack between 0.5 and 5 degrees.

This transitioning rotary wing embodiment comprises a hover rotation angular direction 82 and a locking rotation direction 83 said locking rotation direction opposite the hovering rotation direction wherein movement in the locking rotation direction engages a lock mechanism 84 said lock mechanism securing the rotary wing in the second fixed wing configuration 72.

The rotary wing has an angular direction 85 of rotation and a radial dimension 86 extending outward from the hub 68 in the rotary wing disc 46 (disc is path, not object) of rotation; it further comprises a joint 87 of limited angular pivot around a radial axis 88 in the radial dimension 86 said joint connecting the second blade 70 to the hub 68, said pivot at about 170 (179, 178, 176) degrees. Preferably, the pivoting of the second blade 70 around the radial axis 88 is aerodynamically actuated between a rotary blade lift configuration 89 and a fixed-wing lift blade configuration 90 due to aerodynamics acting on the second blade 70 wherein the second blade 70 in the rotary blade lift configuration 89 deflects air downward and the second blade 70 in the fixed-wing lift blade configuration 90 deflects air downward.

A further embodiment comprises the second blade 70 in a pendular configuration 91 comprising a leading edge 92 above the joint 87, a center of gravity 93 below the joint 87, one first stop 94 limiting the second blade pitch to greater than 1 (0.1, 0.5, 2, 5) degrees and a second stop 95 limiting the second blade 70 to a pitch less than 179 (179.9, 179.5, 178, 175) degrees.

Figure 20:
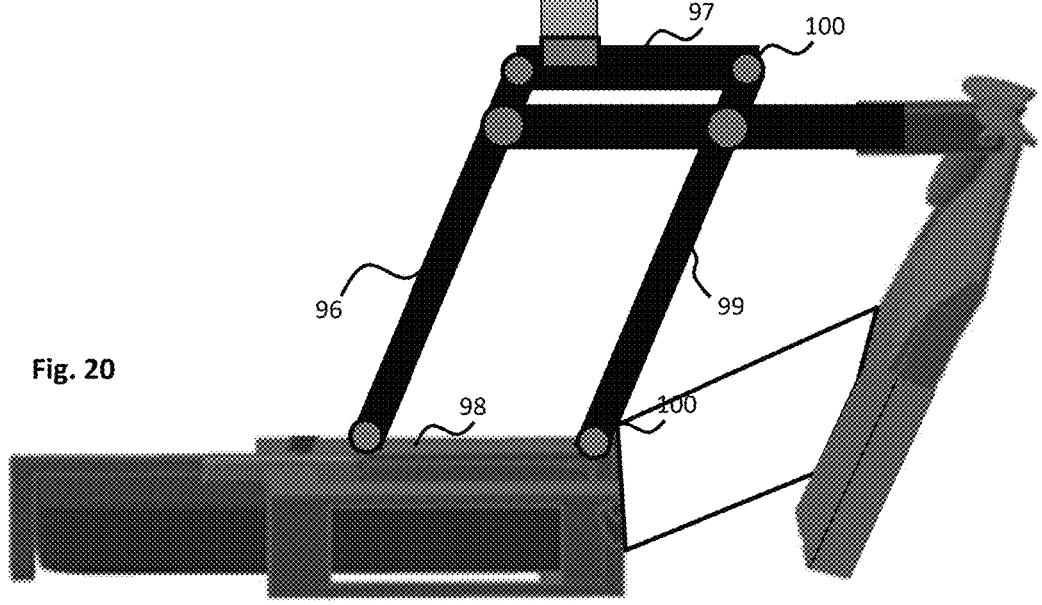
FIG. 20 is an illustration of a dicopter with arm connecting a swaywing to an upper support that attaches to the midsection propulsor where transforming of swaywing to cruising position lowers the midsection propulsor relative to the airchassis.

FIG. 20 illustrates a multicopter with increased vertical movement of a midsection rotary wherein an arm 96, a second arm 99, a support 97, and fuselage compartment 98 form a quadrangle with pivoting corners 100.

The exact configuration is less important than the function of the configuration with transformation, such that an upper rotary wing lowers toward the intermediate airchassis as the fuselage compartment raises toward the airchassis. A quadrangle with form pivoting corners connected to a near-horizontal airchassis through pivoting connections is an example configuration. Arms, levers, gears, tongue-in-groove, bolt-in-slot, and other devices known in the science can be arranged to provide said transformation A locking mechanism may comprise a male part connected to the rotary blade that interacts with female part on non-rotating part like the motor, the airchassis, the tiltwing, or the fuselage compartment. The male-female components may be reversed.

Composite Failsafe Multicopter

Figure 21:
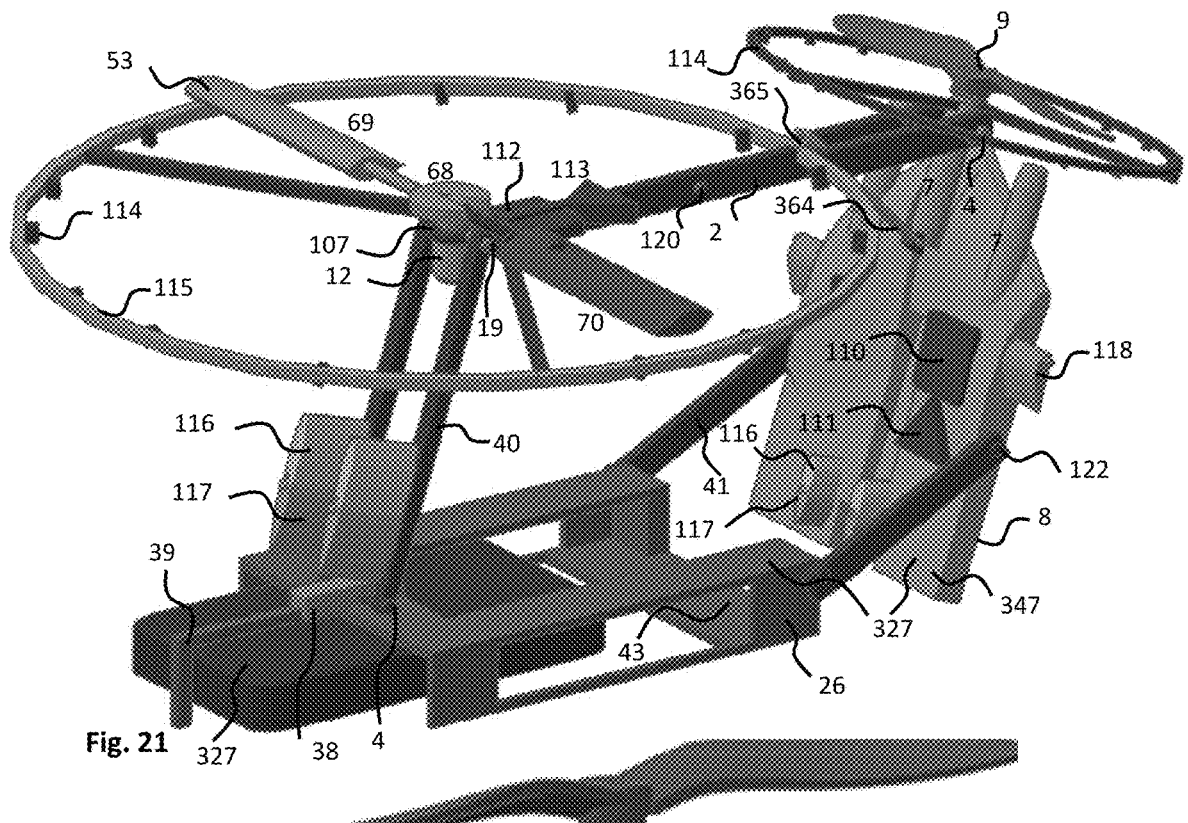
FIG. 21 is more-comprehensive illustration of a multicopter with a front tiltwing, lower swaywing, and control hardware.

FIG. 21 provides a more comprehensive diagram of the preferred multicopter which is comprised of: a) an airchassis (2); b) a single front tiltwing (8) extending in front of the airchassis (2) said front tiltwing (8) comprising a tiltwing propulsor configuration (7), a tiltwing thrust from the tiltwing propulsor configuration, an aerodynamic lift surface (347), a tiltwing power supply (110), and a tiltwing control unit (111), said front tiltwing (8) pivotably connected to the airchassis 2 and configured to pivot between a hovering configuration (5) and a cruising configuration (6);

a counterbalance propulsion configuration comprising propulsors other than the tiltwing thruster(s) where, example counterbalance propulsor configuration include a) a midsection rotary wing and b) two rear propellers spaced consistent with rear propellors of a quadcopter in addition to the tiltwing propulsor configuration comprising at least one propulsor; c) a multicopter center of gravity; and d) a failsafe decent configuration. Preferred operation is where wherein the hovering configuration (5) comprises a balancing of downward force on the center of gravity, upward thrust from the front tiltwing (8), and upward thrust from the counterbalance propulsion configuration; and wherein the failsafe decent configuration is without thrust from the counterbalance propulsion configuration.

More preferred operation is a) wherein the counterbalance propulsion configuration is a midsection rotary wing, b) wherein the front tiltwing is aerodynamically actuated to provide a dampened decent in a cruising configuration with a forward thrust, c) wherein the front tiltwing is aerodynamically actuated to provide a dampened decent in a pseudo-hovering [having a thrust vector more vertical than forward] configuration with a pseudo-hovering upward thrust, d) wherein tiltwing thrust is increased to a value greater than the pseudo-hovering upward thrust prior to (from one to five seconds before) landing, e) wherein the tiltwing propulsor configuration is a single propulsor said single propulsor comprising a propeller, and f) wherein the multicopter comprises a swaywing pivotably connected to the tiltwing.

Preferably, the tiltwing power supply (110) and control unit (111) are in addition to a airchassis power supply (112) and control unit (113) so as to provide for redundancy power, control, and propulsion therein allowing either the tiltwing or midsection rotary wing to land to land the multicopter. A propulsor duct (114) may surround propellors and rotary blades as a bumper to collision. Preferably, propulsor ducts (114) have counter-torque duct vanes (115) along inner surfaces oriented to bend downwash air in a direction opposite the direction of travel of the rotor or propellor blade passing adjacent to the vanes (115).

A vertical stabilizer (116) provides stability and a location to mount a rudder (117). Most preferably, the stabilizer (116) and rudder (117) are attached to an aft swaywing arm (40) in a manner that provides primarily roll control in the hovering configuration and primarily yaw control in the cruising configuration. Similarly, a stabilizer (116) with rudder (117) may be attached to the upper surface of the front tiltwing (8) to provide roll and yaw control.

Preferably at least one aileron (118) is on the front tiltwing (8) configured to provide roll control, most preferably including enabling of yaw control from propeller downwash.

The front tiltwing (8) preferably passively provides pitch control, FIG. 21 illustrates the preferred actuator (364 with 365) in a position to bias the tiltwing and pitch. A flap (362) on the front tiltwing (8) may also be used to bias pitch.

FIG. 21 also identifies hardware for failsafe algorithm control comprised of: a) an airchassis (2); b) a single front tiltwing (8) extending in front of the airchassis (2) said front tiltwing (8) comprising a tiltwing propulsor configuration (7), a tiltwing thrust from the tiltwing propulsor configuration, an aerodynamic lift surface (347), a tiltwing power supply (110), and a tiltwing control unit (111), said front tiltwing (8) pivotably connected to the airchassis (2) and configured to pivot between a hovering configuration (105) and a cruising configuration (6) said control unit (111) comprising sensor input and operational logic to convert sensor input into a rate of decent, a yaw orientation (in degrees relative to nose forward), a roll orientation (in degrees relative to spanwise horizontal), and a distance above a landing site, said control unit (111) comprising a control signal to control the tiltwing thrust such as a speed control system controlling power to the propulsor and communication by hard wire or transmitter-receiver communication; c) a counterbalance propulsion configuration (i.e. comprising propulsors other than the tiltwing thruster(s)) comprising at least one propulsor in addition to the tiltwing propulsor configuration; d) a multicopter center of gravity; and e) a failsafe decent configuration. More preferred operation is a) wherein the hovering configuration (5) comprises a balancing of downward force on the center of gravity, upward thrust from the front tiltwing (8), and upward thrust from the counterbalance propulsion configuration; b) wherein the failsafe decent configuration comprises control of power to the tiltwing propulsor configuration and no power to the counterbalance propulsion configuration; c) wherein the tiltwing thrust is controlled to maintain roll orientation between −20 and 20 [−30 and 30, −10 and 10] degrees from horizontal. By example, if the effective thrust vector goes through the center of gravity (extending in reverse direction from thruster), there will be no roll torque around the multicopter center of gravity and no roll; however, in practice the effective thrust vector will produce a torque around multicopter center of gravity. In the event that other control features cannot adjust for roll, there will be a maximum thrust above which roll becomes excessive; wherein, the objective is to keep roll to a minimum until immediately before impact with the landing site wherein thrust may be increased wherein there is insufficient time for roll to attain a magnitude sufficient to compromise the landing.

More preferred operation is a) wherein the front tiltwing is aerodynamically actuated to provide a dampened decent in a cruising configuration with a forward thrust, b) wherein the front tiltwing is aerodynamically actuated to provide a dampened decent in a pseudo-hovering having a thrust vector more vertical than forward configuration with a pseudo-hovering upward thrust, c) wherein tiltwing thrust is increased to a value greater than the pseudo-hovering upward thrust within 10 seconds of landing (more preferably two to five seconds before landing), and d) where the multicopter comprises an airchassis power supply (112) and airchassis control unit (113) in addition to the tiltwing power supply and control unit.

FIG. 21 illustrates a pseudo-autorotation failsafe landing method comprising [see FIG. 21] comprises: a) an airchassis (2); a swaywing (26) said swaywing (26) located below the airchassis (2) and comprising a fuselage compartment and a lifting body surface said lifting body surface comprising the lower surface of the fuselage compartment, the upper surface of the fuselage compartment, or both the upper and lower surface of the fuselage compartment; wherein the fuselage compartment is the primary payload fuselage compartment consistent with applications such as the passenger cabin of aircraft; c) a swaywing arm (40) mechanically connected to the airchassis (2) through at least one lateral-axis bearing (19) said swaywing arm (40) connected to the swaywing (26) (either mechanically solid or through a bearing); and d) a midsection rotary wing said midsection rotary wing extending above the airchassis and configured to transition to and from a rotor fixed-wing configuration. More preferred operation is a) wherein at least one of the plurality of propulsors extends above the airchassis (2) with an upward thrust (more upward than forward), b) wherein the swaywing (26) is configured to undergo a swaywing actuation toward the airchassis (2) (so as to reduce the median vertical distance between the swaywing and the airchassis) from a hovering configuration (5) to a cruising configuration (6), and c) wherein a failsafe landing sequence is comprised of the steps of a) transition of the fixed-wing rotary-wing position to a rotary wing position, b) transition of the swaywing from the cruising configuration to a hovering configuration, and c) increasing power to the rotary wing within ten seconds of landing.

More preferred operation is a) wherein the swaywing actuation is a passive aerodynamic actuation from aerodynamic lift on the lifting body surfaces; b) with a front tiltwing (8); c) wherein the swaywing arm (40) is a forward extension of the swaywing and the swaywing pivots about the at least one lateral-axis bearing (19); d) wherein the swaywing comprises a plurality of swaywing lateral-axis bearings with one of the swaywing bearings connecting the swaywing to the swaywing arm and wherein the swaywing is configured to swing in the aft and upward directions relative to the airchassis; e) wherein the swaywing arm (40) is an aft swaywing arm and the swaywing is connected to at least one forward swaywing arm (41) through one of the plurality of lateral-axis bearings and the swaywing forward arm (41) is connected to the airchassis (2) through an additional lateral axis bearing (120); f) wherein the swaywing arm (40) is an aft swaywing arm and the swaywing is connected to at least one forward swaywing arm (41) through one of the plurality of lateral-axis bearings and the swaywing forward arm (41) is connected to a front tiltwing (8) through an additional lateral axis bearing (122); g) wherein yaw control is at least partially achieved by aerodynamic forces on vanes (114) of a duct (115) surrounding the midsection rotary wing; h) wherein a midsection propulsor 12 is engaged to provide additional vertical thrust in a hard landing; i) with a midsection rotary blade 12 downwash 30 wherein the swaywing first position 27 is displaced below the airchassis with a vertical gap 31 for downwash 30 air flow and the swaywing second position 28 is adjacent to the airchassis with a reduced gap 32 for downwash 30 air flow; configuration 14 within the last ten seconds of decent; and j) wherein the swaywing's lifting body surface comprises/forms a lift path.

Figure 28:
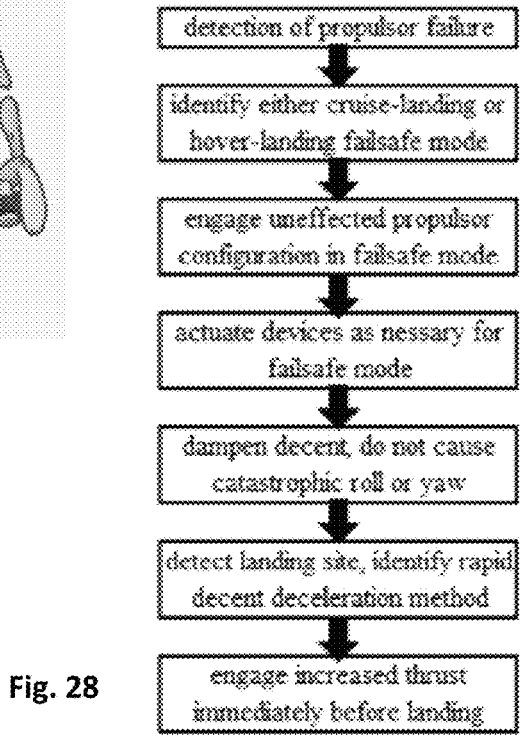
FIG. 28 is a failsafe landing algorithm.

FIG. 28 provides the failsafe landing algorithm written generically for failsafe landing with either a front tiltwing or a midsection rotary wing which is not equipped with a swashplate.

Preferred Electric Motor

Highly compact and light weight electric motors are particularly enabling for the multicopters of this invention. The preferred electric motor comprises a high-flux density design based on axial flux generating circuits.

The following embodiments apply equally well for generators as motors. Motor is used as a short term for rotary induction device that includes motors and generators.

Figure 23:
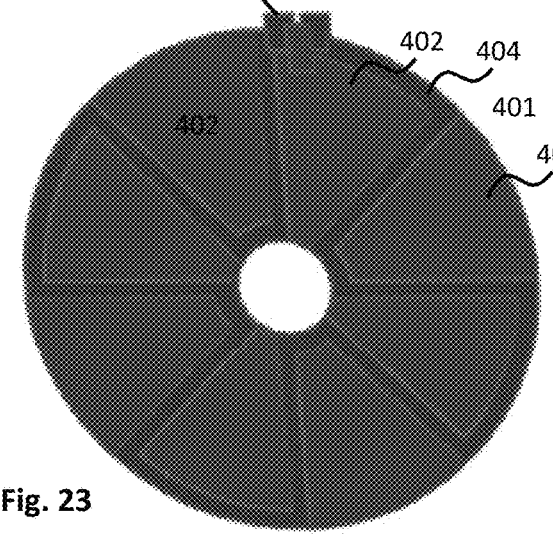
FIG. 23 is an axial-flux single-wire loop disc with stator connections.
Figure 24:
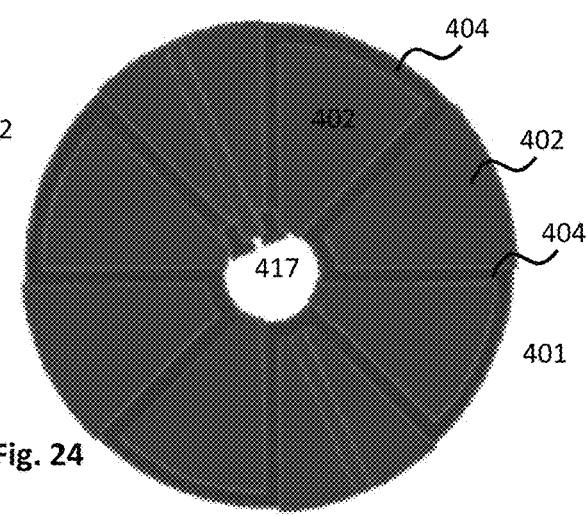
FIG. 24 is an axial-flux single-wire loop disc with rotor connections and convention vanes.
Figure 25:
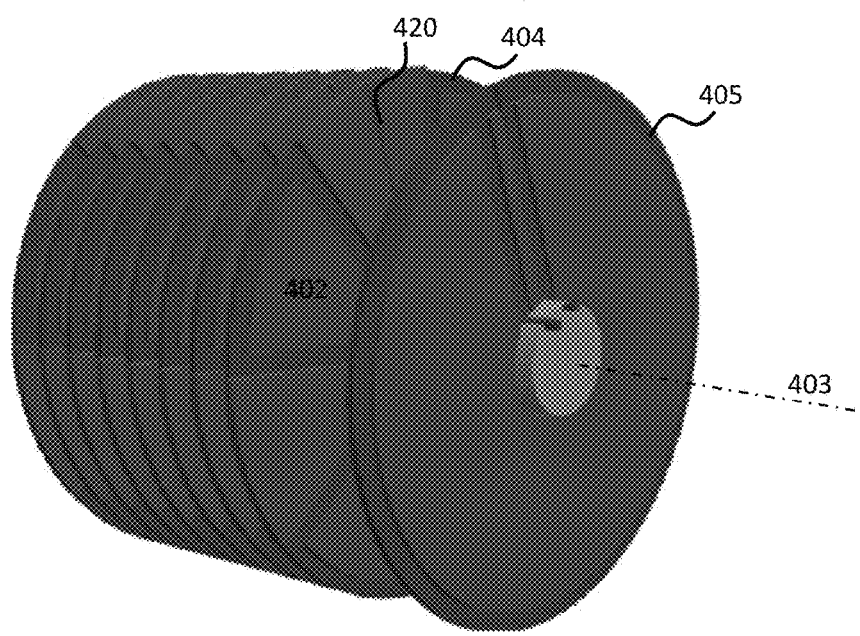
FIG. 25 is a stacked disc rotor with shaft, secondary loop, and multiple rotor discs.

A preferred axial-[magnetic]-flux electric motor circuit comprises a motor containment [as distinguished for motor housing] said motor containment comprising an axis of rotation, a motor housing, and a motor shaft; at least one axial-flux disc (401) comprising a plurality of magnet cores (402) angularly spaced around the center axis (403) and a plurality of single-wire partial loops (404) adjacent to the magnet cores (402) (see FIG. 23 and FIG. 24); at least one secondary loop (405, see FIG. 25 and FIG. 26) connected to the single-wire partial loops (404) forming a low-voltage circuit; and at least one primary coil (406) (see FIG. 27) configured to induce current into the secondary loop (405) said primary coil (406) powered by a moderate voltage power supply line (407). During operation a high current is induced in the low-voltage circuit causing rotation of the motor shaft.

Options on the circuit include: wherein the single-wire partial loops are connected in series; the single-wire partial loops are connected in parallel; and the plurality of electromagnetic cores are comprised of a material for the list air, iron, ferromagnetic powder, ferromagnetic material.

Figure 26:
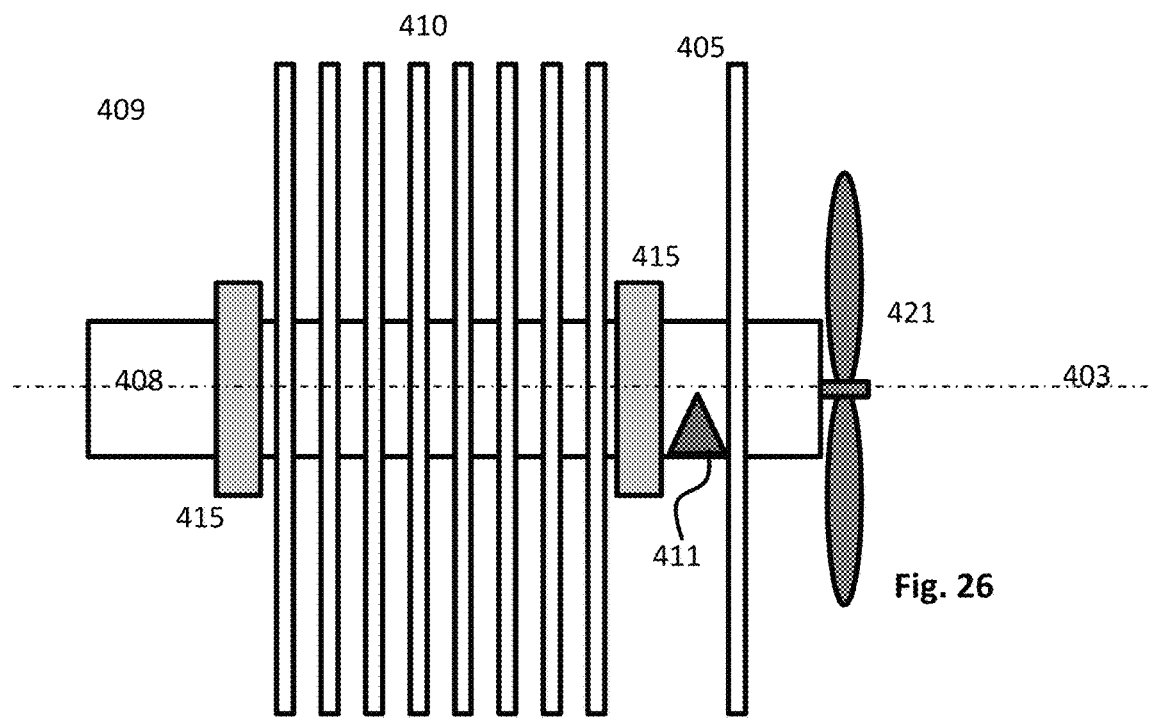
FIG. 26 is a side view of a stacked disc rotor embodiment of this invention.

More preferred are rotor configurations wherein said secondary loop is an axial-flux secondary loop wherein the axial-flux secondary loop and at least one axial-flux disc are attached to the shaft to form a rotor-shaft (408) configuration (409) (see FIG. 26). Optionally, the at least one axial-flux disc is one of a plurality of axial-flux discs laterally spaced along the axis of rotation (403) and connected to the motor shaft forming a stacked disc rotor configuration (410). An AC to DC converter (411) may operate wherein the secondary loop AC current is converted to DC current in the partial loops which could operate in a mode where the plurality of axial-flux discs include electromagnet discs and permanent magnet discs.

Figure 27:
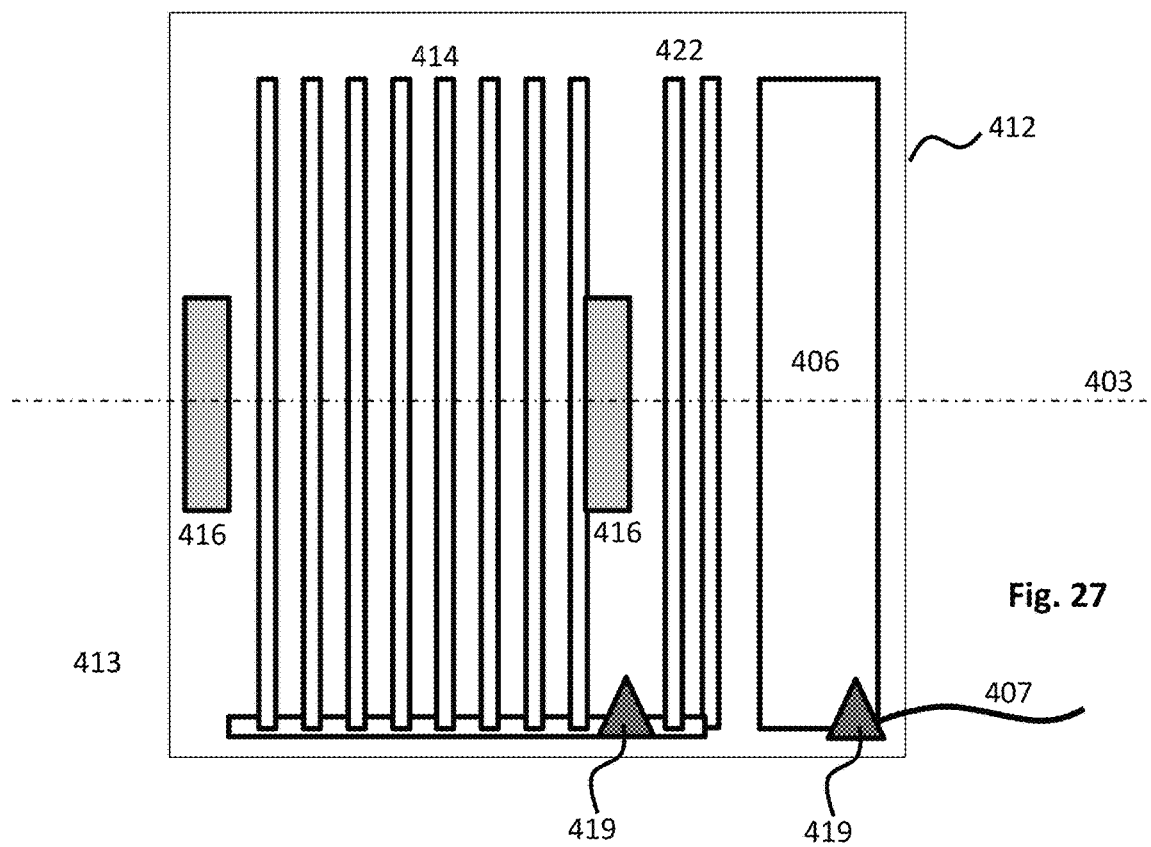
FIG. 27 is a side view of a stacked disc stator in motor (or generator) housing illustrating primary coil.

More preferred are rotor configurations wherein said secondary loop is attached to the motor housing (412) to form a stator configuration (413) (see FIG. 27). Optionally, the at least one axial-flux disc is one of a plurality of axial-flux discs laterally spaced along the axis of rotation (403) and connected to the motor housing forming a stacked disc stator configuration (414). An AC to DC converter may be used with the secondary loop AC current to provide DC current in the partial loops. The plurality of axial-flux discs may include electromagnet discs and permanent magnet discs.

Items consistent with completing the motor include: a) a bearing (415) that connects the shaft to a housing connection (416), b) shaft-directed conductive connectors (417) locations on the discs c) housing-directed conductive connectors (418), d) control systems (419) to control motor speed and/or partial loop powers, e) vanes (420) in rotor discs to facilitate convective heat transfer, and f) a fan (421) mounted on the shaft to cool the primary coil. Either the stacked-disc rotor configuration or the stacked-disc stator configuration may be configured to provide constant polarity magnets.

A plurality of secondary coils (422) may be connect to provide distinct circuits in a stacked-disc configuration so that all the partial loops are not oriented at the same orientation relative to the magnetic fields of interaction.

Washer-type slot-positioned spaces between rotor discs can facilitate assembly and electrical connectivity of stacked disc rotors.

A mode of operation includes use of several light-weight air core discs that are useful for providing bursts of power when efficiency for the short durations is not extremely important. Air core discs with parallel loops could be used in combination with ferromagnetic core discs with loops connected in series.

The embodiment of a secondary loop (405) attached to and rotating with the rotor is not limited to the above application and is not limited to single or partial loop coils or circuits.

Other Multicopter Configurations

The invention includes an aerial vehicle comprising: a wing 301, a thruster 302 statically connected to the wing 301 forming a passively-adjusting tiltwing 303, a lateral axis 304 passing through the wing 301 having a thrust orientation freely rotatable from a vertical thrust configuration 305 to a horizontal thrust configuration 306. Vertical is wing 301 leading edge up. The lateral axis 304 is an imaginary line used for invention specification. Impacting air from horizontal flight impacts the wing and produces a torque around the lateral axis 304, and the thrust orientation is passively set by a balance of torques generated around the lateral axis 304. The preferred aerial vehicle is a multicopter.

The movement of the passively-adjusting tiltwing 303 is inherently dampened by the inertia from the mass of the passively-adjusting tiltwing 303. Tiltwing dampening may be supplemented.

The thruster 302 has a motor axis center of rotation 309 where in the horizontal thrust configuration 306 said motor axis 309 is an imaginary line extending longitudinally forward and preferably located at or below the lateral axis 304. Said passively-adjusting tiltwing has a center of gravity ("cg") where in the vertical thrust configuration 305 said cg is at or below the lateral axis 304. In the horizontal thrust position, the tiltwing's cg generates a positive torque around the lateral axis 304 (herein, implicitly defining positive torque direction); impacting air from horizontal flight produces a negative torque around the lateral axis 304. Here, positive torque is a force toward increasing the pitch angle of the tiltwing.

When the thruster axis does not intersect the lateral axis, the thrust of the motor produces a torque around the lateral axis 304. This is an additional degree of freedom in the passive movement and positioning of the passively-adjusting tiltwing. The tiltwing cg producing a positive torque dictates the tiltwing cg is located aft (toward tail) the tiltwing pivot axis 304.

Optionally and as possible, a thruster axis passes, or effective axes of thruster pairs pass, through the vehicle's cg.

Examples of thrusters include a propeller attached to an electric motor and a jet engine. Horizontal thrust (and horizontal configuration) generates force to propel the aerial vehicle in the longitudinal (horizontal direction of travel) direction. Vertical thrust is thrust to propel the vehicle upward. Preferably, thrust from the tiltwing during vertical takeoff is less than half the total vertical takeoff thrust and lift force from the tiltwing is less than half the total multicopter weight.

A preferred aerial vehicle is comprised of a left passively-adjusting tiltwing 310 and a right passively-adjusting tiltwing 311 connected by a shaft 312 passing through a bearing said bearing 313 connected to a fuselage 314.

A preferred aerial vehicle is comprised of an electromagnetic 315 connected to the fuselage 314 and magnetic material 316 contacting the shaft 312 where activation of the electromagnet 315 creates a force on the shaft 312 wherein said force locks the shaft against rotation.

A preferred aerial vehicle is comprised of a damper 317 with a moving damper component 18 connected to the shaft 312 and a stationary damper component 19 connected to the fuselage 314. The damper of this embodiment dampens movement within a predetermined angle range of rotation.

More preferably, the aerial vehicle is a multicopter comprising: a fuselage, a fuselage thruster, a wing 301, and a tiltwing thruster 302 statically connected to the wing 301 forming a passively-actuated tiltwing 303, wherein a bearing mechanically couples the tiltwing and the fuselage said tiltwing freely rotatable relative to the fuselage within a predetermined angular range, wherein impacting air produces a torque force on the tiltwing said tiltwing passively positioning at an angle within the angular range balancing torques within the bearing, and wherein thrust of the fuselage thruster relative to thrust of the tiltwing thruster controls the pitch of the fuselage. Preferably, the tiltwing is near the front of the fuselage and thrusters directly connected to the fuselage are near the rear of the fuselage. Preferably the first and a second fuselage thrusters are set at an angle between 50 and 85 degrees relative to the median angle of the fuselage's lower surface.

Illustrative Examples 304 and 305 identify the following preferred design features: a) a cg below the tiltwing axis 304 provides a robust and reliable method to position the tiltwing for vertical thrust for takeoff and landing wherein at tiltwing angles from 0 to 90 degrees the cg produces a positive torque force by the convention that the cg biases toward increased pitch, b) the negative torque force resulting from the vehicles forward velocity relative to air is the force enabling passive adjusting and critical to performance, and c) an additional positive torque force is needed to bias in the desired vertical position during takeoff and landing. A variety of devices are available to provided this biased force; a partial list includes: a) torque resultant of force of the tiltwing thruster said motor have an axis of rotation below the bearing axis, b) torque resultant of a spring having a first end connected to the fuselage and a second end connected to the tiltwing, c) torque resultant of a variable force electromagnetic damper with a first end connected to the fuselage and a second end connected to the tiltwing, and d) torque resultant of tiltwing thruster prop slipstream impacting a back-side concave surface of the wing 301.

The tiltwing centroid ratio (distance from lateral axis 304 to the center of gravity divided by distance from lateral axis 304 to aerodynamic force centroid) is a critical design parameter for tiltwings with preferred values between 0.2 to 5 with the latter for higher velocity aircraft. For all tiltrotor centroid ratios, the center of gravity was sufficiently below the lateral axis 304 so as to provide a strong pendular stability; this translates to Lc (distance from the lateral axis 304 to the tiltwing center of gravity) being greater than 10% of the longest chord of the wing 301, more preferably greater than 20% of the longest chord of the wing 301, and most preferably between 30% and 50% of the longest cord of the wing 301.

Herein, multicopter is an aerial vehicle with two or more thrusters such as electric-motor-driven propellers. More preferably, a multicopter is a tricopter or quadcopter. The tiltwing preferably rotates in a spanwise axis which is a lateral axis, and rotation of tiltwing around the axis is typically block from rotating more than 120 degree ranges, from 0 to 120 degrees (horizontal is zero, positive degrees are vertically upward from zero).

A preferred aerial vehicle includes two stops 320 and 321 on the fuselage that physically restrict shaft 312 rotation to a range up to about 120 degrees. Movement of the tiltwing's leading edge rearward from vertical creates a stable position for leg extensions of the passively-adjusting tiltwing to support the weight of a parked vehicle. However, passive control is easier when the tiltwing (thrust vector) angle rotates from about 70 degrees to 0 degrees wherein the axis of rotation of the thruster coincides approximately with the cord of the wing 301.

Optionally, two tiltwings with axis of rotation having a substantial, but not totally, spanwise vector with mechanical connecting to the fuselage through two bearings in a manner symmetric to a vertical plane passing through a longitudinal center axis of the fuselage.

Preferred options on the preferred embodiment include a) the bearing coupling a shaft in a spanwise axis wherein the shaft is connect to the tiltwing, b) the shaft passing through the fuselage and connecting to the tiltwing on both sides of the fuselage where the fuselage is broadly identified as the vehicle body and any arm extensions from the fuselage, c) use of two tiltwing thrusters said two tiltwing thrusters being electric motors turning propellers, and d) use of two fuselage thrusters said two fuselage thrusters being electric motors turning propellers.

A preferred aerial vehicle is comprised of a third thruster 322 with mechanically adjustable orientation 323 from horizontal thrust orientation through vertical thrust orientation. Preferred operation is for this third thruster 322 to be adjusted by the pilot (person or autonomous) after vertical takeoff to provide for forward movement. That forward movement impacts the orientation of freely rotating passively-adjusting tiltwings that passively adjust from vertical toward more-horizontal flight. Vertical flight includes stationary flight (fixed altitude).

A preferred aerial vehicle includes a flap 324 located in front of the wing 301 and connected to a fuselage 314 wherein different flap 324 orientations deflect air differently on the wing 301 producing different torques around the lateral axis 304. Different torques result in different orientations of the passively-adjusting tiltwings.

Figure 22:
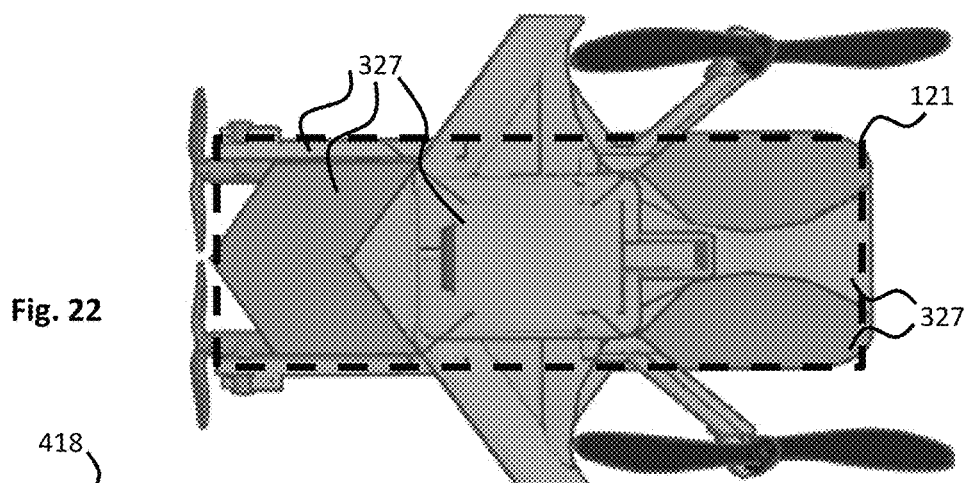
FIG. 22 is a top view of a tiltwing quadcopter showing liftpath in cruising configuration.

Optionally, the vehicle includes a wing that is a spoiler 325 connected to an end of a fuselage 326 referred to as a thrust-spoiler. The thrust-spoiler may be in the front, tail, or both front and tail of a vehicle. Preferably, the spoiler 325 section of the thrust spoiler is continuous extension of fuselage lifting-body surfaces 327 when in the horizontal position. FIG. 22 illustrates how several lifting-body surfaces 327 combine to form a liftpath 121.

The preferred aerial vehicle includes a left passively-adjusting tiltwing 310, a right passively-adjusting tiltwing 311, and an end thruster 328. The preferred aerial vehicle includes a passively stable configuration comprising: an adjustable first thruster 329 with orientation that is specified by a vehicle control system, a second thruster having an inherently stable orientation for each orientation of the adjustable thruster 329. More preferably, the vehicle includes a passively stable configuration comprising: a mechanical support joint 30 having an adjustable angle attached to adjustable thruster 329. Optionally, the aerial vehicle includes a passively stable configuration comprising: a mechanical arm 331 attached to the fuselage that contacts a adjustable passively-adjusting tiltwing comprising the adjustable thruster 329.

While previously indicated as at the rear, the mechanical arm 331 may contact and adjust a wing or a spoiler. The objective is to keep actuators (e.g. electromagnets, motors, hydraulics, electronics) on and in the fuselage as opposed to a passively-adjusting tiltwing.

Optionally, and when preparing for landing, the aerial vehicle includes a control algorithm comprising the sequence of reducing speed of a (back) motor, maintaining desired flight pitch by setting a flap orientation, and allowing orientation of one or more thrusters to progress toward a more-upward orientation.

Figure 7:
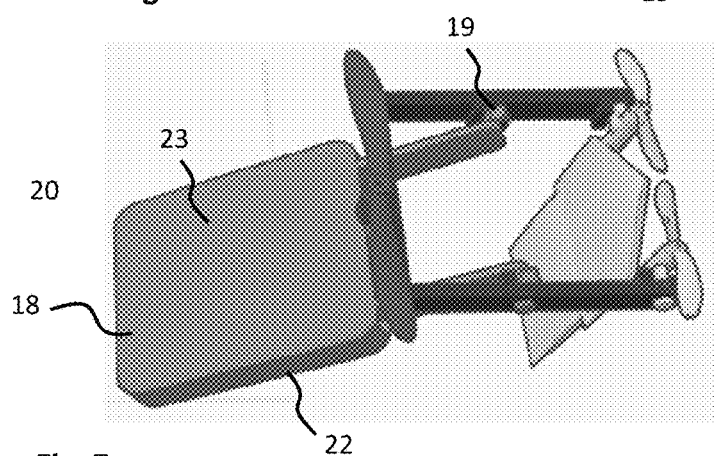
FIG. 7 is an illustration of a tricopter version of a multicopter in cruising position with a freewing fuselage compartment in a loading (or unloading) position.

The preferred aerial vehicle includes a horizontal partial cylindrical path 332 in the fuselage with cylindrical perimeter 333 in proximity of outer-most rotational path of thruster blades with axis of rotation in vertical position wherein horizontal surfaces of the fuselage extend from the perimeter 333 away from the axis of rotation. This is illustrated by FIGS. 7 and 9.

The preferred aerial vehicle includes a lifting body fuselage comprising: a cabin, said cabin having an average cabin length, a cabin average width, and a cabin average height; a lift path, said lift path having a width greater than six tenths the cabin average width and said lift path having a length greater than seven tenths the cabin average length; said lift path having a front third with a front average pitch, a back third with a back average pitch, and a middle third with a middle average pitch; wherein the back average pitch is 1 to 3 degrees less than the front average pitch.

The preferred aerial vehicle includes a wing with ratio of cord to thickness greater than 10 and a wing aspect ratio (span/cord) less than 2.0. Larger wing spans are not needed when using lifting-body fuselage designs. A preferred embodiment is a lifting body aerial vehicle comprising a passively-adjusting tiltwing, a fuselage, and fuselage outer surface area wherein at least half of the fuselage outer surface area has a pitch and slant within 2 degrees.

Improved Thruster Design

An improved electric motor is comprised of multiple stator discs 414, multiple rotor discs 410, and a common shaft 408; wherein the discs are spaced along the shaft with stator discs on each end in an alternating sequence of rotor and stator discs, wherein the discs are comprised of angularly spaced magnetic cores 402 at set distance from the shaft, wherein a conductive wire loop 404 said loop having a path adjacent to perimeters of the cores alternating from contact with inner and outer sections of the core perimeters where inner and outer is with respect to the radius of the disc, and wherein said loop is the secondary partial coil of a primary induction coil said induction coil induces an alternating current in the loop.

A preferred electric motor is comprised of a wire of the loop 404 where the wire is a tube through which a cooling fluid is circulated wherein the cooling fluid is routed to and from a heat exchange surface and heat is removed from the cooling fluid. A preferred rotor moves air in the spaces between the rotor and stator discs to advance cooling where the loops is near the surfaces to facilitate cooling.

Preferably, a single cooled primary coil produced a filed traveling through an aligned set of cores of the stator discs wherein the aligned discs are cores of the secondary partial coils said secondary partial coils being part of the said loop. Herein, one cooled primary coil energizes the loop for multiple magnetic cores on multiple stator discs to provide a high torque motor.

Tricopter and Quadcopter

A preferred drone application is a lifting body aerial vehicle comprising a) a plurality of thrusters 343, b) a vehicle front 44 and a vehicle tail 345, c) a fuselage 346 said fuselage having a total wetted surface area, an upper surface 347, and a lower surface 348, d) a fuselage landed orientation 349 with a longitudinal centerline 350 landed-position axis said axis being an imaginary line, d) a fuselage cruising orientation 351 said cruising orientation having a longitudinal centerline cruising-position axis 352 said axis being an imaginary line, e) an exterior surface tangent line said line tangent to the surface said line being an imaginary line said tangent line having a pitch angle relative to the landed position, a pitch angle relative to the cruising position, and a slant angle, and f) an overall thrust angle said angle being the angle of the cumulative thrust of all thrusters relative to vertical with positive in toward the front of the vehicle.

Preferably, in the cruising position at least half the surface area's slant angles are between −4 and 4 degrees and at least half the pitch angles are between 0 and 4 degrees. Also, in the cruising position the overall thrust angle is more preferably between 0 and 30 degrees. Also, in the landed position the overall thrust angle being near 90 degrees.

An optional rear flap 353 may be used to augment lift and to change the average pitch of the lower surface. Legs 354 are at lengths as appropriate to provide a net upward thrust when in the landed position. The lifting body has a rounded front (edge or nose) to provide favorable aerodynamic features.

In general, liftpath features are incorporated on the lifting body of the preferred drone.

Preferred Quadcopter

A most-preferred quadcopter embodiment comprises: a fuselage, a front tiltwing said front tiltwing having two thrusters, a pair of rear thrusters, and a total aerodynamic lift surface area including the tiltwing and quadcopter fuselage but not including propeller blades; wherein, the lift provided by the tiltwing is less than half the lift provided by the total aerodynamic surface area. Quadcopters of FIGS. 17 and 18 meet these most-preferred criteria.

Figure 11:
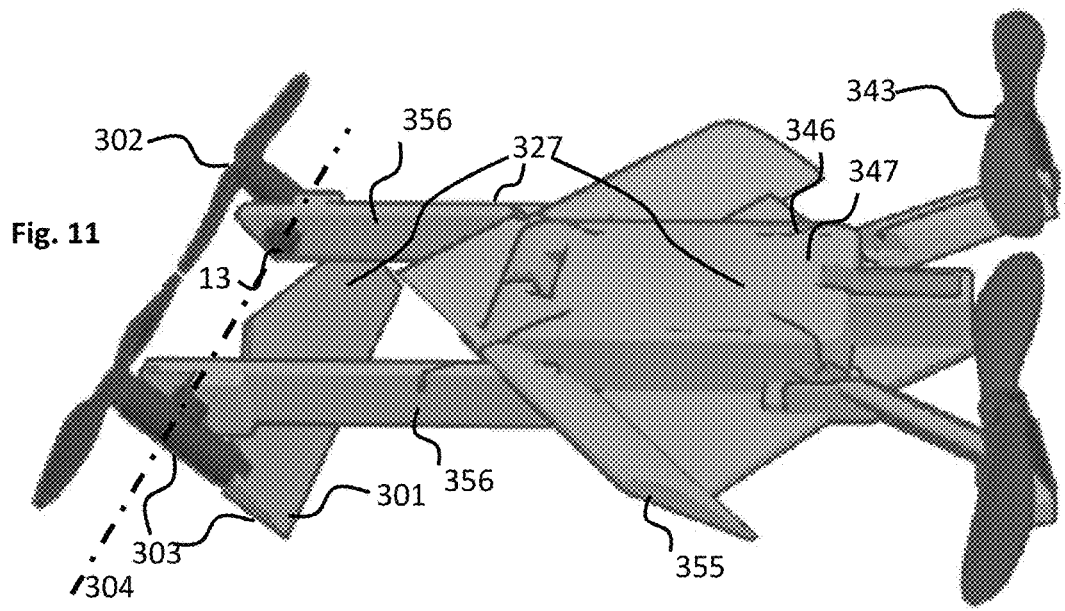
FIG. 11 is a quadcopter with a passively-adjusting single front tiltwing in front of a single fuselage.
Figure 14:
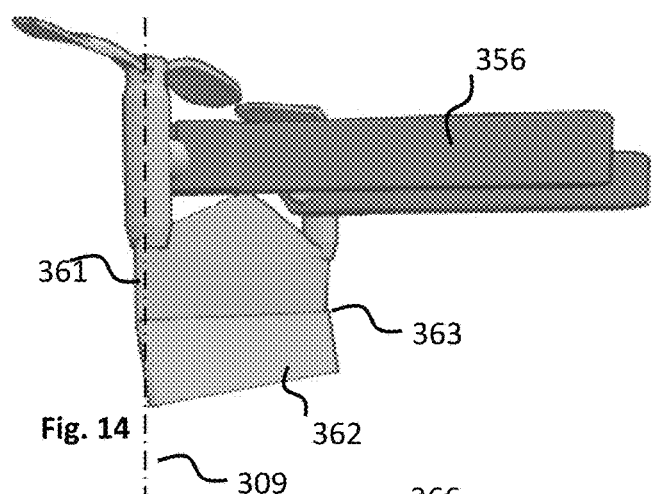
FIG. 14 is an illustration of a tiltwing with flap in a fixed position to bias wing in high pitch position at low velocities.
Figure 13:
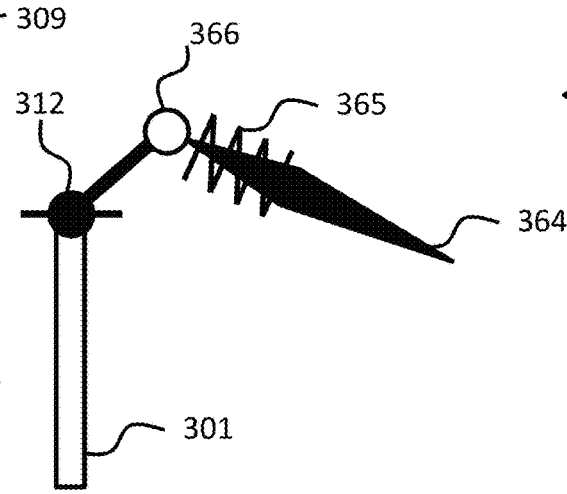
FIG. 13 is an illustration of a positive torque electromagnet actuator for use with tiltwing.

The most-preferred quadcopter has a passively-adjusting front tiltwing and a fixed wing extending laterally from the sides of the fuselage 355 such as the quadcopter of FIG. 11. At some scales, like small toys, the only controlled electronics are the speeds of the four electric motors of thrusters which are electric-powered propellers.

Arms 356 projecting from the fuselage to the tiltwing bearings 313 are considered part of the fuselage in defining embodiments of these inventions. By example and functionally, relatively narrow arms minimize prop slipstream from hitting the larger surfaces of the fuselage.

Figure 17:
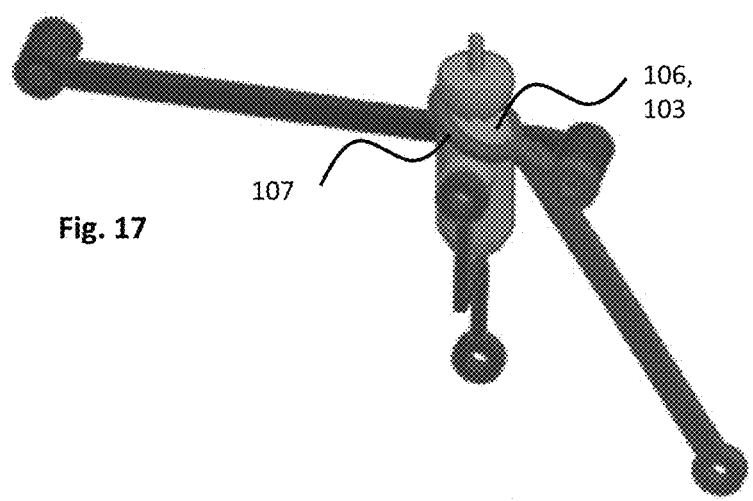
FIG. 17 is an illustration of alternative configuration of a pendular midsection propulsor configured to approach airchassis as swaywing positions in cruise configuration.
Figure 18:
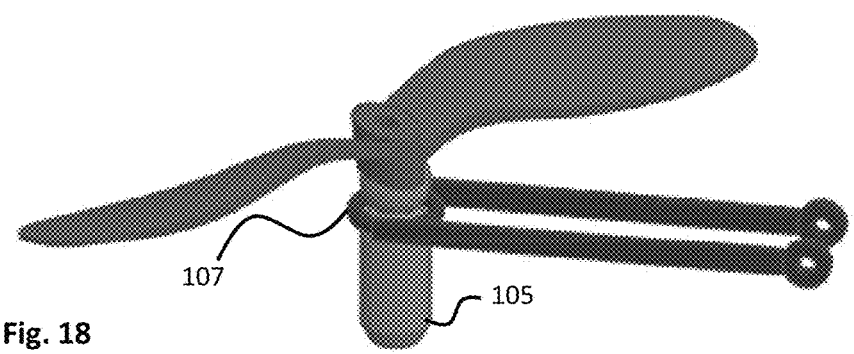
FIG. 18 is an illustration of a pendular midsection propulsor motor with ball on socket/donut configuration.

FIGS. 17 and 18 show the most-preferred quadcopter configurations with a pair of rear thrusters fixed in a tiltrotor position at an angle of 45 to 85 degrees relative to the fuselage (where fuselage is at 0 degrees pitch); more-preferably between 70 and 90 degrees.

The vehicle comprising a passively-adjusting tiltwing may be a tricopter comprising a pair of fixed tilt thrusters located on opposite sides of the fuselage. Preferably, the pair of thrusters are propeller thrusters of opposite rotation. The preferred rotation of a pair of propeller thrusters so that angular vectors of the propellers facilitate forward thrust.

Preferably, the tricopter is comprised of a fuselage and a fixed wing extending laterally from the sides of the fuselage. The tricopter has a total aerodynamic lift surface area including the tiltwing, any fixed wing, and a lifting body fuselage but not including propeller blades; wherein, the lift provided by the tiltwing is less than half the lift provided by the total aerodynamic surface area.

More-preferably, tiltwings on all multicopters of the embodiments of this invention have lift surface areas less than one third the total lift aerodynamic lift surface areas of the multicopters.

Optionally, the multicopter is connected to freewings (tiltwings without thrusters); said freewings may act as shudders that smooth air flow past propellers that are not needed for cruising.

Optionally, the tricopter has a rear prop that is larger than two symmetric side props and wherein the two side props have the same rotation and the rear prop has an opposite rotation that of the side props. Alternatively, the aerial vehicle is tricopter and wherein a front prop is larger than two symmetric side props and wherein the two side props have the same rotation and the front prop has an opposite rotation that of the side props.

Tricopter embodiments of this invention are not limited to transitioning tricopters. In the more general sense, the tricopter embodiment comprises a fuselage, a fuselage bottom surface 348, a median longitudinal tangent angle of the fuselage bottom surface, a front thruster 360, two rear thrusters said two rear thrusters 359 statically connected to the fuselage at an angle between 50 and 85 degrees relative to the median longitudinal tangent angle of the fuselage bottom surface, and a rudder said rudder 358 located in the slipstream of the two rear thrusters. A performance advantage of this embodiment is that tricopter yaw, roll, pitch, and velocity can be controlled by actuator settings said settings being three motor speeds and a rudder angle. Herein, the term "thrusters" is short for thrusters. Alternative to the thrusters being mounted at an angle, the rudder axis of pivot may be mounted at an angle, preferably form 30 to 85 degrees. Alternatively, the tricopter comprises a fuselage, a fuselage bottom surface, a median longitudinal tangent angle of the fuselage bottom surface 348, a front thruster 360, two rear thrusters said two rear thrusters 359 producing a slipstream, rear motor axes of rotation for the two rear thrusters said rear motor axes of rotation having a pitch, and a rudder 358 said rudder having an axis of rotation said rudder axis of rotation having a pitch said rudder located in the slipstream of the two rear thrusters, wherein the rudder axis of rotation pitch is more than five degree different than the rear motor axes of rotation pitches.

As an alternative to statically connecting thrusters to a fuselage, the thruster may be connected to an arm's first end with the arm's second end connected to an extension of the fuselage by a hinge joint of limited vertical movement. For this embodiment, when the thruster is not operating, the thruster is in a lower position said lower position optionally being more aerodynamically streamlined with the fuselage with an example thrust vector pitch of about 90 degrees relative to the fuselage. When the thruster is operating at high upward thrust, the thruster hinges to a lower pitch with an example thrust vector pitch of about 70 degrees. Herein, the motor is not "statically connected" to the fuselage; rather, it is "set" at an angle (or pitch) relative to the fuselage.

The quadcopter embodiments apply to other multicopters. Preferred is a multicopter is comprised of a single front passively-adjusting tiltwing in front of a single fuselage, at least one rear thruster, and a plurality of longitudinally-extending lift-generating surfaces (327) forming a total aerodynamic lift surface area; the plurality of longitudinally-extending lift-generating surfaces comprising the fuselage (346), the front passively-adjusting tiltwing (303), and an arm (356) mechanically connecting the front passively-adjusting tiltwing to the fuselage; wherein the plurality of longitudinally-extending lift-generating surfaces forms a liftpath wherein lift provided by the front passively-adjusting tiltwing is less than half the lift provided by the total aerodynamic lift surface area.

Lifting Body Options

The most preferred lifting body fuselages have lift paths on both upper and lower fuselage surfaces. Lift is generated by higher pressure on lower surface 348 and lower pressure on upper surface 347.

The most-preferred embodiment of this invention is an aircraft with an upper lift path surface (hereafter upper LiftPath) and a lower lift path surface (hereafter lower LiftPath) on the upper and lower surfaces of the fuselage, respectively. The LiftPaths 121 are generally rectangular in shape having a width similar to the fuselage width and a length along most of the fuselage. During flight the LiftPaths bend air downward to create a lift force and transfer that force to the aircraft on surfaces of relatively low pitch so as to preserve a high ratio of lift to drag forces. Preferred applications include but are not limited to fixed wing aircraft and tethered lifting-body gliders.

Surface slant (also referred to as slant angle) is illustrated by U.S. patent application Ser. No. 16/240,715; wherein, following notation of that application, slant is an angle formed in the vertical-lateral plane between a line tangent to a surface and a horizontal plane with the vertex at the aircrafts plane of symmetry. Surface slant is defined for a surface with the aircraft at zero roll and zero angle of attack. In a forward facing position, positive slant angle changes are counterclockwise for upper surfaces on starboard side and lower surfaces on port side and clockwise for upper surfaces port side and lower surfaces starboard side.

The Liftpath width is defined in terms of a generally flat, concave, or piecewise flat surface said width having a horizontal lateral dimension of length between points on LiftPath edges said edges generally specified wither the surface slant progresses from more than −8 degrees to less than −8 degrees.

In the more-preferred embodiment, the aircraft has: a cg, an exterior surface, an aircraft front, an aircraft tail, a maximum width, surface pitch angles relative to a reference plane, and surface slant angles 301. The preferred aircraft uses liftpath surfaces on both the top and bottom of the fuselage.

The more-preferred aircraft comprises (a) a fuselage; (b) a plurality of high-lift-to-drag (L:D) capturing surfaces having: surface areas, pitch angles between 0 and 2 degrees, an average pitch angle, and slant angles between −4 and 4 degrees; (c) a plurality of lift-stabilizing surfaces located behind the cg having: surface areas, pitch angles between −2 and 1 degrees, slant angles between −4 and 4 degrees, and an average pitch angle less than the average pitch angle of the L:D capturing surfaces; (d) at least one lift path surface (LiftPath) extending longitudinally on the fuselage having: a median width, a median length, a surface area, a fore end, an aft end, a port edge, and a starboard edge; and (e) a payload fuselage compartment in the fuselage having a median maximum width and a median length.

Further more-preferred aspects are the aircraft wherein: (i) the lift path surface is within the aircraft's exterior surface with a transition from the edges and ends of the lift path surface wherein the transition at the port and starboard edges has slants greater than −2 degrees, the transition at the aft end has pitches greater than −2 degrees, and the transition at the fore end has pitches less than 4 degrees, (ii) the lift path surface's median width is greater than one ninth the aircraft's maximum width, (iii) the lift path surface's median width is between than eight tenths and twelve tenths the payload fuselage compartment's median maximum width, (iv) the lift path surface's median length is greater than seven tenths the payload fuselage compartment's median length, (v) greater than one fourth of the total lift path's surface area is comprised of lift-stabilizing surface areas, (vi) greater than two thirds of the total lift path surface areas are comprised of high-L:D-capturing surface areas, and (vii) the pitch reference plane is the plane of tangency on the lift path at the lift path's closest point to the aircraft's cg.

Preferably the lift-stabilizing surface area behind the cg is between 53% and 70% of the total high-lift-to-drag-capturing surface area.

Optionally, there are fences on both sides of the lift path surface wherein the fence has a vertical extension between 2% and 20% of the lift path's median width and an outward horizontal extension between 0% and 20% of the lift path's median width. Preferably the lift path's surface connects smoothly and continuously with a wing's surface and the fence's vertical extension goes to zero at a location by the wing's surface.

Optionally, there is a platform on each side of the fuselage, each said platform having a vertical thickness between 1% and 20% of the lift path's median width, a width between 1% and 70% of the lift path's median width, a length between 30% and 100% of the lift path's median length; wherein, the lift path's surface connects smoothly and continuously with a platform surface and the fence's vertical extension goes to zero at a location by the platform's surface.

Optionally, there is a cabin walk-path vertical extension of the lift path surface said extension expanding a portion of the lift path surface away from the payload fuselage compartment wherein said expansion has a width between one and four feet.

Optionally, there is an upper lift path surface wherein said upper lift path surface is a lift path surface on the top of the fuselage. Optionally, there is a pressure-reducing canopy having a continuous and smooth surface connection to the fore end of the upper lift path surface wherein: said pressure reducing canopy having a median slant between −4 and 4 degrees, a forward pitch of less than −10 degrees, a continuous mid-section pitch reaching a peak height at a zero degree pitch, a starboard side, a port side, a width extending from the lift path port side to the lift path starboard side, and a smooth surface connection to upper lift path surface. Optionally, there are fences on both sides of the pressure reducing canopy wherein the fences have equal vertical extensions between 2% and 20% of the lift path's median width and an outward horizontal extension between 0% and 20% of the lift path's median width Optionally, there is an upper rear wing said upper rear wing having an upper surface and a lower surface wherein the lift path's surface connects smoothly and continuously with the upper rear wing's upper surface.

Optionally, there is a lower lift path surface wherein said lower lift path surface is a lift path surface on the bottom of the fuselage. Optionally, there is a pressure-generating surface having a continuous and smooth surface connection to the lower lift path surface wherein: said pressure generating surface having a median pitch between 20 and 50 degrees on the front of the fuselage, a median slant between −4 and 4 degrees, and a continuous decrease in surface pitch until the smooth and continuous connection with the lower lift path surface. Optionally, there are fences on both sides of the pressure-generating surface wherein the fences have equal vertical extensions between 2% and 20% of the lift path's median width and an outward horizontal extension between 0% and 20% of the lift path's median width. Optionally, there is an upper rear wing said lower rear wing having an upper surface and a lower surface wherein the lift path's surface connects smoothly and continuously with the lower rear wing's lower surface.

Optionally, there is an upper rear wing, a lower rear wing, and fuselage sides, wherein the distance between the fuselage sides decreases to a vertical edge between the upper rear wing and the lower rear wing.

Optionally, there is one or more rear wings where the rear wing is a swept wing.

Optionally, there is a wing, an energy storage means, and a propulsion means wherein the wing has a wingspan greater than three times the median maximum payload fuselage compartment width.

Optionally, there is a tether wherein the aircraft is a tethered glider and the tether pulls the aircraft along a guideway.

Optionally the aircraft is in supersonic flights and wherein a Liftpath is on the upper surface of the fuselage.

Optionally, there is a rudder at the feed or discharge of a rear propeller wherein the rudder in a state of hovering flight.

Alternatively, the lift path surface embodiment is an embodiment of lift path surface sections, where: (d) a plurality of lift path surface sections extending longitudinally on the fuselage having: a median width, a median length, a cumulative surface area of all lift path sections, fore ends, aft ends, port edges, starboard edges, and a lift path section of closest approach the aircraft's cg. Here the limits on "surface's" of the preferred embodiment apply to the "surface sections's".

Control Strategy

A performance advantage of HS-drone is high-L:D-capturing surfaces; of which, the fuselage surface is particularly important for VTOL. A set point of control algorithms is maintaining nose-up orientations (positive) that are preferably 0 to 10 degree fuselage pitches; wherein, 0 pitch (i.e. horizontal) is when the median angle of the fuselage's lower surface 348 relative to horizontal is 0 degrees. More-preferably, fuselage orientations are 1 to 4 degree pitches when cruising at greater than 50% of maximum velocity.

Figure 12:
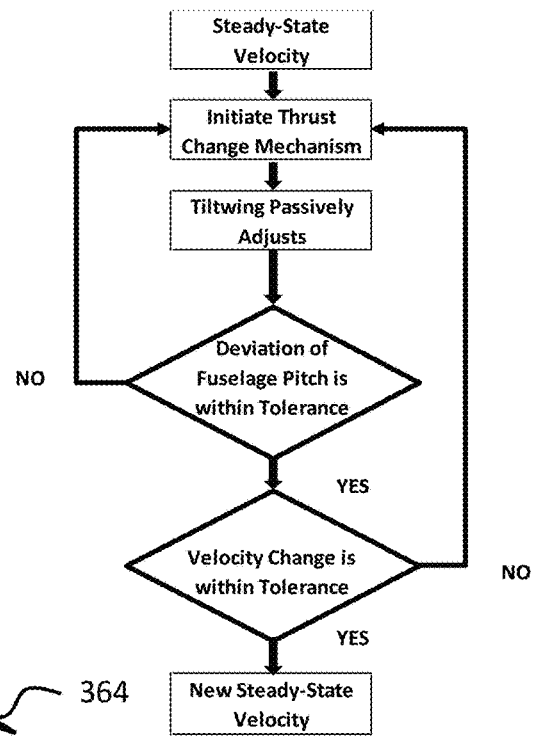
FIG. 12 is an algorithm for changing steady-state velocity.
Figure 15:
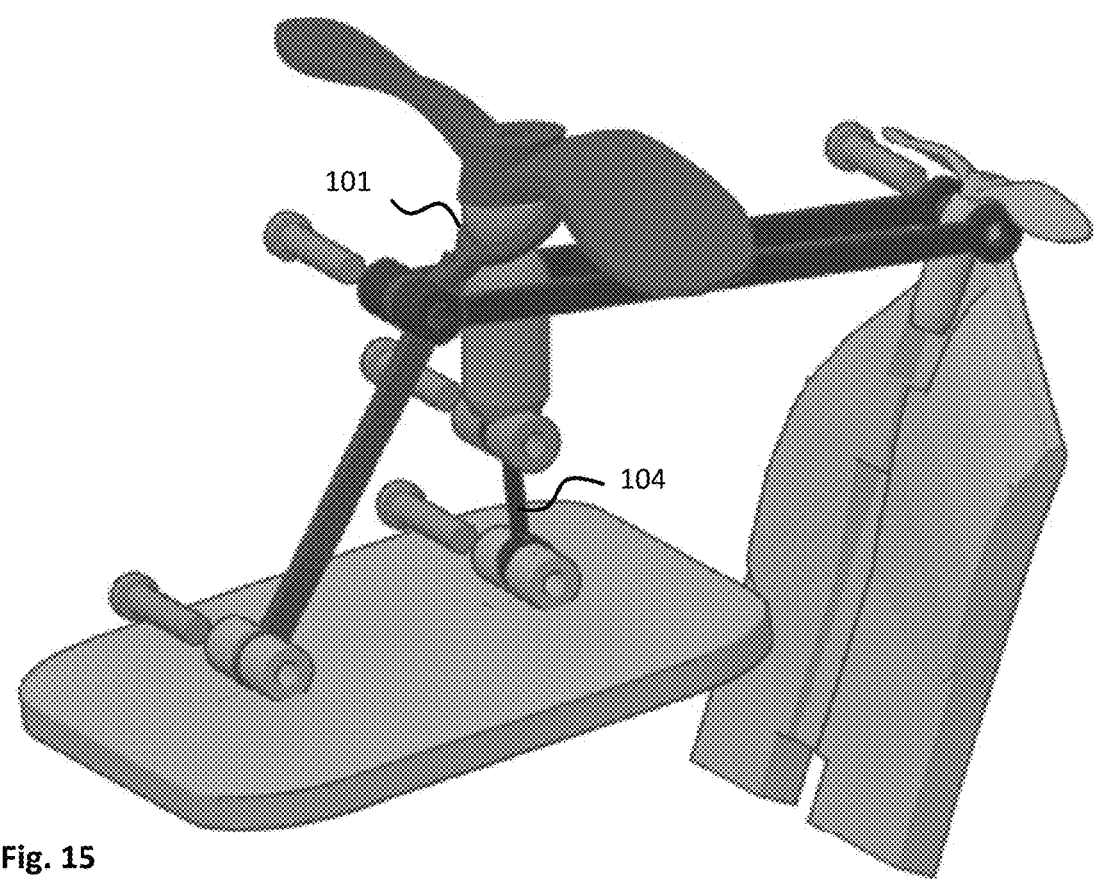
FIG. 15 is an illustration of a pendular midsection propulsor configured to approach airchassis as swaywing positions in cruise configuration.
Figure 16:
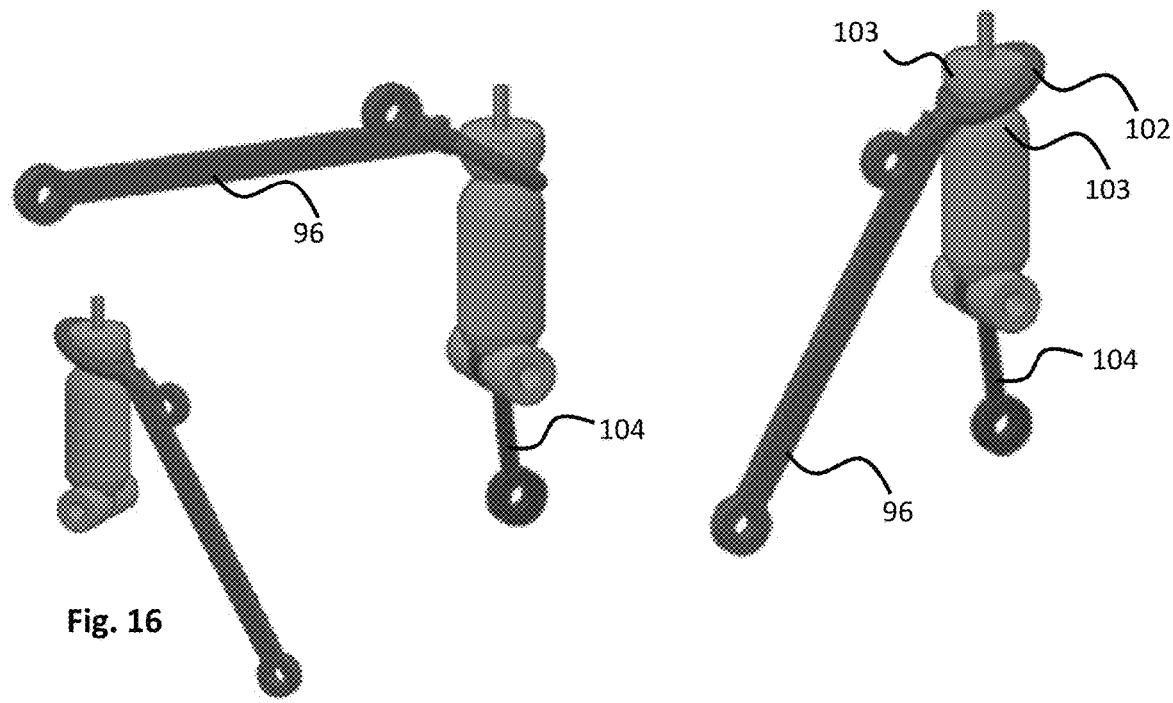
FIG. 16 is an illustration of expanded views of pendular connection of swaywing arm to midsection propulsor motor.

Critical in the control algorithm is control during transition of steady-state velocities including the transition from hovering to cruising. When changing velocity, it is important to keep the fuselage in a nose up and close to a targeted pitch that is typically between 0 and 10 degrees at moderate to high velocities. FIG. 12 illustrates the preferred algorithm for changing velocities with blocks discussed in the following paragraphs.

Initiate Thrust Change Mechanism—An aspect of this invention is that most of the forward thrust is provided by a passively-adjusting tiltwing 303. A change in the tiltwing 303 position and respective thrust is provided by an initial change referred to as a perturbation. Initiating a change in the tiltwing requires a different source of thrust in the horizontal direction that can be actively controlled, and examples of such devices and actions include: a) changing the pitch setting of the vehicle by changing the thrust of rear thrusters relative to front thrusters, b) adjusting a flap or rudder so as to direct more air rearward, and c) using an actuator to change the tilt on a thruster.

Tiltwing Passively Adjusts—With a change in velocity, the tiltwing 303 adjusts to a new steady-state angle in response to a different aerodynamic torque on the wing 301. This change in angle leads to a change in both velocity and lift, both arriving at a new steady-state values with the new steady-state angle. This relationship between fuselage pitch, tiltwing 303 angle, and velocity is dependent on the ability of the fuselage, fixed wings, and tiltwing wing aerodynamic lifts to replace thruster lift. Flawed aerodynamic lift designs lead to reaching 0 fuselage pitch prior to attaining targeted velocities; and if the tiltwing 303 angle is still relatively high (e.g. >40 degrees) at this point, increases in energy efficiencies will be minimal.

Fuselage Pitch Tolerance Check—If the fuselage is within tolerance of the pitch set point no feedback control is needed at this point; otherwise, the actuator used to perturb the velocity is changed.

If vehicle pitch is used to perturb velocity, steady-state dynamics exist where decreasing vehicle pitches correspond to decreasing steady-state tiltwing 304 angles, and higher velocities. For this to occur, thrusters attached to the vehicle must be at a forward tilt relative to the fuselage such as the preferred tilt of the rear thrusters of the FIG. 11 quadcopter of 70 to 90 degrees.

Use of pitch control to control velocity requires no actuators beyond a minimum of four (e.g. rotational speed so thrusters). Adjustment of a flap or actuator change of tilt of a thruster require actuators beyond four.

Velocity Tolerance Check—In the case of methods other than pitch control to change the angle of the tiltwing 303, an additional feedback loop may be used to attain a targeted velocity. It should be noted that the fuselage pitch feedback loop is part of the algorithm to keep the fuselage pitch positive and prevent an over-adjustment of an actuator from a nose-down position that is inefficient.

In poor designs, it is possible for a nose-down position to lead to out-of-control decrease in tiltwing angle, increasing loss of lift at the front of the vehicle with decreasing tiltwing angle, and crash the vehicle if not corrected in time. For a tricopter with only three thruster actuators, a rudder having a non-vertical axis of rotation may be used as the fourth actuator so long as that rudder impacts the air flow of at least one thruster. The preferred yaw-control rudder 358 has an axis of rotation at 45 degrees from vertical in the longitudinal-vertical plane. The rudder's 358 axis of rotation is preferably at an angle between 30 and 90 degrees relative to the median longitudinal tangent angle of the fuselage bottom surface.

Controlled Actuators

For a transition tricopter rudder to achieve yaw control in a tricopter as a fourth actuator, the tricopter rudder must be able to direct air sideways (laterally) from a) at least one thruster for control in hover mode and b) air impacting form forward velocity in cruising mode. The sideways/lateral directing/vectoring is a lateral acceleration and thus provides a force to control yaw. When the rear thrusters are at a fixed angle/pitch less than about 85 degrees (greater than 15 degrees forward), a rudder in the air flow of the rear thrusters will provide needed yaw control.

For a tricopter with two fixed-angle thruster propellers of opposite rotation attached to the fuselage, a sheath radially outside the propeller path of the tricopters third thruster reduces adverse impacts of the third thruster on yaw control.

In a more-general sense, when a rudder is in the air flow of thruster and the axis of rotation of the rudder is at a different angle than the axis of rotation of the thruster, the rudder can provide yaw control. To increase gain as a yaw control, the pitch angle of the rudder may set at an angle other than 90 degrees, such as 110 degrees.

Safety Measure

An observed safety issue of the passively-adjusting tiltwing is that poor designs can lead to rapid decreases in the pitch of the tiltwing with rapid loss of lift and a nose dive when the tiltwing is at the front of the vehicle. To compensate for this issue, preferably, the thruster is attached to the wing its axis of rotation below the tiltwing's axis of rotation. In this design, a rapid increase in thrust of that motor torques the tiltwing toward greater pitch.

Preferred Actuator

A preferred actuator to provide position control is comprised of: a) an electromagnetic coil 364 with control system said coil connected to the fuselage and b) a internal electromagnet core rod 365 said rod having a first end attached to a device for positioning and a second end attached to a spring (or functional equivalent of the spring) and a section of continuously increasing ferromagnetic strength from a first end to a maximum before continuously decreasing to the second end; wherein, a first spring end is attached to the second rod end and the second spring end is attached to the fuselage.

Optionally, the spring may be removed (see FIG. 23) or reduced in tensile force from the preferred actuator in this alternative actuator embodiment the actuator acts as a damper (analogy to 317), the rod 365 is a moving component (analogy to 318) that moves within a stationary electromagnetic coil 364 (analogy to 319). The first end 366 of the electromagnetic rod is mechanically connected to provide torque on the tiltwing shaft 312. This optional configuration allows control of the electromagnetic coil to control a torque on the shaft 312. This optional configuration can be used both to dampen and to bias the tiltwing pitch. In this embodiment, application activation of the magnetic coil while at a vertical thrust position biases the tiltwing with negative torque toward a position with a forward thrust vector useful for initial acceleration. When the tiltwing is at or near it's minimum angle/pitch, activation of the coil will bias the tiltwing with a positive torque force useful to pull out of a nose-down loss of forward lift.

Hovercraft Ground Operation

Optionally, thrusters of a multicopter feed air into a pocket on the underside 348 of the fuselage where the pocket is defined by: a) an upper surface being in part the bottom of the fuselage 348 and in part space below at least one thruster, b) a lower surface being earth's surface, c) sides being fences extending along the sides of and below the bottom of the fuselage 348, d) a front freewing with spanwise axis of rotation along the front edge of the bottom of the fuselage said freewing blocked in rotation angle from a pitch of 0 to 90 degrees of pitch, and e) a rear freewing with spanwise axis of rotation below part of a rear thruster and about the same vertical position as the fuselage bottom 348 said freewing blocked in rotation angle from a pitch of 0 to 90 degrees of pitch. The pocket forms when the multicopter is close to the ground. Pressure in the pocket creates a force that biases the front freewing to a 90 degree pitch. Preferably, a connecting arm connects the front freewing to the back freewing in a manner that causes the pitch of the front freewing to match the rear freewing; wherein, the pressure biasing the front freewing to 90 degree pitch compensates for a countering bias of the rear freewing and wherein gravitational or other forces cause both freewings to be near 90 pitch at lower multicopter velocities. As velocities increase, impacting air torques both freewings toward 0 degree pitch positions therein converting the hovering fuselage compartment to a liftpath.

Optionally, wheels are mounted into the fence for free longitudinal movement of the multicopter.

Concave-Back Tiltwing

It is an option to apply a third positive torque on the tiltwing at low velocities to bias the wing in a more-vertical position (higher pitch) for takeoff and landing. The thruster's axis of rotation 309 passes through the partial chord of the top part of the wing 361 being about parallel to the averaged surface areas of the top part of the wing. The lower part of the wing 362 as angled toward the arms 356 that connect the tiltwing to the vehicle. More generally, the design is concave 363 toward the fuselage. The connection to the motor is such to minimize prop slipstream on the surfaces of the top half of the wing 361 while hitting the fuselage-side on the lower part of the wing 366.

Preferred asymptotic cord vectors at the top of the wing 301 align with the thruster's axis of rotation 309. Preferred asymptotic cord vectors at the bottom of the wing 301 are at an angle of 2 to 5 degrees relative to the thruster's axis of rotation 309. More generally, and for multicopters, a rudder is in a configuration to laterally deflect slipstreams to augment yaw control.

Freewings

To augment tiltwing and fuselage lift on the fuselage, laterally extending freewings may be attached to the multicopter fuselage. These freewings may be load-bearing, such as bearing batteries to power the thrustmotors. Preferably, rotation of the freewings is blocked to limit operation to a range from about 1 to 90 degrees relative pitch (pitch relative to pitch of fuselage). Preferably, the freewing weight with payload is equal to the aerodynamic lift of the freewing at 60% to 90% of maximum cruising velocity at the lower end of the pitch position range (e.g. 1 degrees). Thus, at velocities greater than that needed to support the weight of the loaded freewing, excess freewing lift is applied as lift force to the fuselage.

The advantage of the freewing embodiment on HS-Drone manifest primarily if the freewing supports a load where the total mass of the freewing (i.e. freewing and load) is equal to the aerodynamic lift of that freewing at an air angle of attack of the freewing between 2 and 20 degrees at a velocity equal to one half the vehicles maximum velocity. For a freewing (and a tiltwing) the air angle of attack is equal to the air angle of attack on the fuselage plus the angle of the freewing relative to the fuselage.

Freewing Actuated Fence

Preferred upper fuselage liftpaths of this invention have fences on both sides of the liftpaths. To prevent the fence from creating high resistance to prop slipstream, two design embodiments are preferred. A first embodiment attaches the fences to a freewing (or tiltwing) such that as the freewing pitch angle decreases, the fence moves block air movement from between the liftpath and the fences. In a second embodiment, the fences are statically attached to the liftpath with air ducts between the fences and the liftpath said air ducts directing air from the liftpath to duct exits below the fences, wherein, as the freewing pitch angle decreases a surface connected to the freewing blocks air flow through the ducts.

Using there two embodiments, two propeller thrusters on opposite side of a fuselage can better accommodate a fuselage corridor from a front to a rear cabin fuselage compartment, therein, moving the vehicle center of gravity more rearward and placing more load on a pair of rearward propellers relative to a front tiltwing.

Twin Hull Configuration

Figure 19:
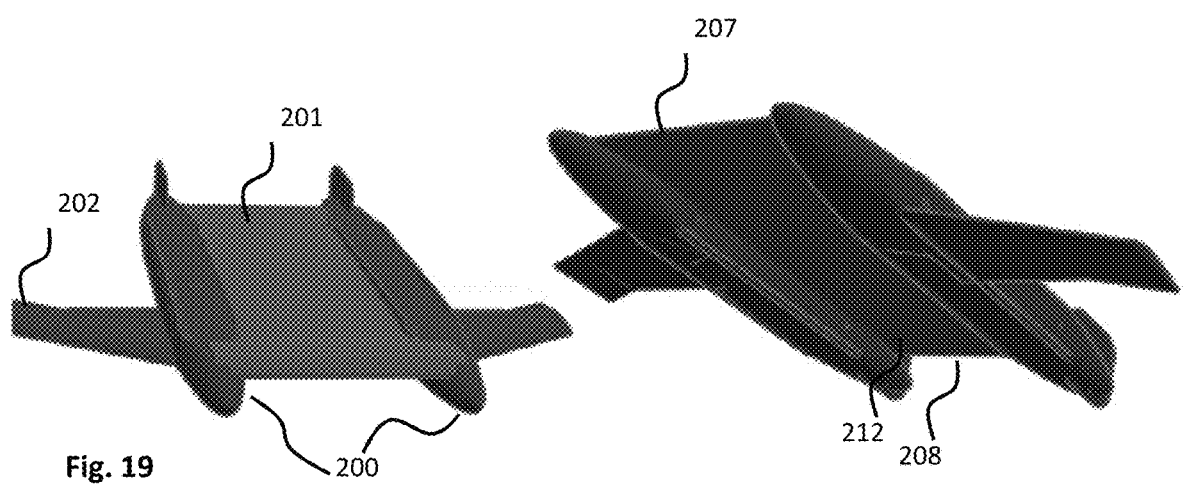
FIG. 19 is an illustration of a twin-hull aircraft configuration with platform to increase lift.

The twin-hull configuration of FIG. 19 provides a method to achieve very high lift to drag ratios. Here, an aerial vehicle comprises two parallel hulls 200, a platform 201 configured to connect hulls 200 in a continuous manner to prevent air flow between the platform and the hulls, wings extending 202 laterally outward from the hulls, and a wingspan 203; said hulls having a median hulls height 204, a median hulls length 205, and a median hulls width 206; said platform having a forward edge 207, an aft edge 208, a median platform width 209, a median platform thickness 210, and a median platform length 211; wherein the median platform length 211 is more than two times the median platform width 209, the median platform width 209 is more than ten times the median platform thickness 210, and the median hulls height 204 is more than five times the median platform thickness 210.

A further embodiment comprises the platform having a bottom surface 212, a forward quarter 213 having a forward quarter median pitch 214, an aft quarter 215 having an aft quarter median pitch 216, and a configuration where the median pitch 214 of the forward quarter 213 is at least 4 degrees greater than the median pitch 216 of the aft quarter 215. A further embodiment comprises a means to adjust the median pitch 214 of the forward quarter 213 relative to the median pitch 216 of the aft quarter 215. A further embodiment comprises compression spanwise structure trusses 217 connecting the hulls 200 below the platform 201 wherein the platform 201 a spanwise tensile structural platform 218 configuration wherein the platform is convex upward in the spanwise direction. A further embodiment comprises a means to extend the platform 201 in the aft direction during flight to create an extended platform 219. A further embodiment comprises a means to extend the platform 201 in the spanwise direction during flight to create a spanwise expanded platform 220. A further embodiment is wherein the platform forward edge 207 is rounded similar to a forward edge of an airfoil and the aft edge 208 is sharp similar to the aft edge of an airfoil. A further embodiment is wherein from the forward edge 207 to aft edge 208 the platform is a continuous series of airfoil configurations. A further embodiment comprises a forward tractor-type propulsor 221 connected to a tractor wing 222 said tractor wing having a tractor wing median pitch 223, said propulsor 221 pivotably connected to the forward edge 207 of the platform and a configuration such that aerodynamic forces act on the platform 201 passively adjusting the median pitch 214 of the platform's forward quarter 213 separate from the forward median wing pitch 223.

The plate between fuselages is preferably convex-downward adjustment for takeoff. The plate may house solar panels are placed on its upper surface.

Fabrication Using 3D Printing

A structural body 250 comprised of at least two segments 251 connected with a connection 252 said segments 251 have ducts 253 for flow of thermoset resin 254 said ducts 253 open to an injection port 255, said connection 252 comprises at least two connection ducts 256 said connection ducts 256 open to flow between the two segments 251, wherein a monomer mixture 254 is injected into the injection port 255 with flow through the ducts 253 256 thereafter setting and forming a thermoset polymer 257 in the ducts 253 256.

A further embodiment is wherein a cable 258 is in the duct 256 and the thermoset polymer 257 forms around the cable 258. A further embodiment is wherein the cable 258 is in a suspension position from end-to-end of the structural body 250 and wherein a compression-resistant upper truss 259 proceeds end-to-end of the structural body 250 wherein the cable 258 and upper truss 259 form a structural truss configuration 260 within the structural body 250. A further embodiment is wherein the segments 251 are printed with a 3D printer and wherein the upper truss 259 is comprised of the thermoset polymer 257.

3D printing of HS-Drone components provides for rapid prototyping and easy CAD modification with iterations in prototyping; however, the structural properties of most 3D print filaments and resins are inferior to high performance thermoset polymers. A preferred method to realize the benefits of high performance thermoset polymers is to incorporate injection ducts and cavities in the 3D-printed components wherein the cavities are strategically at locations and shapes to provide extra strength where needed and wherein the ducts connect the cavities to an entrance and exit port for injecting a reacting thermoset resin. The exit ducts may be smaller so as to accommodate exiting air rather than exiting resin.

The invention claimed is:

1. An aerial vehicle comprising a plurality of lift-generating surfaces;
   the plurality of lift generating surfaces comprising a lifting body surface and a tiltwing;
   the tiltwing: a) pivotably coupled to the lifting body surface through a pivotable connection, b) comprising at least one tiltwing propulsor, and c) configured to pull the lifting body surface;
   the lifting body surface comprising a liftpath and a platform, said platform comprising: a) a median platform width greater than ten times a median platform thickness and b) a median platform length greater than the median platform width;

wherein: a) the liftpath is configured to enable flight and defines an approximately-flat aerodynamically-contiguous surface, b) aerodynamic forces actuate the position of the tiltwing relative to the lifting body surface to provide passively stable flight, and c) the liftpath includes at least part of a lower or an upper surface of the platform.

2. The aerial vehicle of claim 1, the aerial vehicle configured to cruise with liftpath air angles of attack between 0 and 2 degrees.

3. The aerial vehicle of claim 1 wherein: a) the aerial vehicle is a multicopter comprising a counterbalance propulsor system and an airchassis, b) the tiltwing is a front tiltwing, and c) the airchassis, front tiltwing, and counterbalance propulsor system are transitionable through passive actuation to a default failsafe descent configuration, the failsafe descent configuration conducive to landing without catastrophic damage to at least one of the airchassis, front tiltwing, counterbalance propulsor system, and a payload.

4. The aerial vehicle of claim 3, wherein: a) the counterbalance propulsor system provides negligible thrust while the airchassis, front tiltwing, and counterbalance propulsor system are in the failsafe descent configuration and b) the counterbalance propulsor system is aft of the front tiltwing.

5. The aerial vehicle of claim 1, further comprising an airchassis, a swaying platform, a swaying platform total wetted surface area, and a swaying platform total liftpath surface area, the swaying platform located below the airchassis and pivotably coupled to the airchassis and the swaying platform total liftpath surface area is greater than one third the swaying platform total wetted surface area.

6. The aerial vehicle of claim 1 further comprising fences on both sides of the lifting body surface, the median height of the fences between 2% and 20% of the median width of the lifting body surface.

7. The aerial vehicle of claim 1, further comprising solar cells on the lifting body surface and an energy storage means connected to the solar cells.

8. The aerial vehicle of claim 1, wherein the tiltwing is configured to be aerodynamically actuated to a pseudo-hovering configuration to provide a dampened descent by a pseudo-hovering upward force, said pseudo-hovering upward force having a combination of lift and thrust.

9. The aerial vehicle of claim 1 comprising laterally-extending wings with wing aspect ratios less than 2.0.

10. An aerial vehicle comprising a plurality of lift-generating surfaces;

the plurality of lift generating surfaces: a) configured to form a liftpath having a rectangular approximately-flat aerodynamically-contiguous surface and b) comprising a lifting body surface and a tiltwing;

the tiltwing: a) pivotably coupled to the lifting body surface, b) comprising a tiltwing propulsor, and c) disposed fore or aft of the lifting body in all flight configurations;

wherein the liftpath is configured to enable flight and defines the rectangular approximately-flat aerodynamically-contiguous surface comprising a lateral width and a longitudinal length, said longitudinal length greater than the lateral width.

11. The aerial vehicle of claim 10, comprising at least one counterbalance propulsor wherein:

a) the aerial vehicle is a multicopter, b) the tiltwing is a single front passively-adjusting tiltwing in front of the lifting body surface, c) the lifting body surface is a single fuselage, and d) lift provided by the front passively-adjusting tiltwing is less than half the total multicopter weight.

12. The aerial vehicle of claim 11 wherein the front passively-adjusting tiltwing is freely rotatable relative to the single fuselage within a predetermined angular range around a tiltwing axis.

13. The aerial vehicle of claim 11, further comprising an airchassis, the single fuselage comprising a swaying platform, and the airchassis pivotably connected to both the swaying platform and the single front passively-adjusting tiltwing.

14. The aerial vehicle of claim 11, comprising a control system capable of configuring the multicopter for a failsafe landing where greater than eighty percent of lift on the multicopter is generated by the tiltwing propulsor.

15. The aerial vehicle of claim 10, the liftpath defining air angles of attack between 0 and 2 degrees.

16. The aerial vehicle of claim 10, comprising structural or control surfaces extending from the rectangular approximately-flat aerodynamically-contiguous surface.

17. A landing method for landing a multicopter comprising a plurality of failsafe methods;

the multicopter comprising a front tiltwing, a vehicle center of gravity, a front tiltwing propulsor configured to provide a front tiltwing propulsor force, said front tiltwing propulsor force being a vector sum of a front tiltwing propulsor thrust and a front tiltwing propulsor lift, said multicopter configured to provide: a total multicopter lift, a total multicopter thrust, a first failsafe configuration, and a second failsafe configuration;

a first failsafe method comprising: transitioning the front tiltwing to a first failsafe configuration wherein the total multicopter lift is more than four times greater than the front tiltwing propulsor lift and the tiltwing propulsor thrust is at least eighty percent of the total multicopter thrust; and a second failsafe method comprising transitioning the front tiltwing to a second failsafe configuration wherein the front tiltwing propulsor lift is greater than one third of the total multicopter lift and the front tiltwing propulsor lift is greater than the total multicopter thrust.

18. The landing method of claim 17, wherein passive aerodynamic actuation performs at least one of the first failsafe method and the second failsafe method.

19. The landing method of claim 17 including a third failsafe method;

the third failsafe method comprising: a) transitioning a midsection rotary wing from a fixed wing position to a rotary position, the midsection rotary wing coupled to and extending above an airchassis, the midsection rotary wing also coupled to a power supply and a control unit; and b) increasing power supplied by the power supply to the midsection rotary wing prior to landing;

wherein the rotary wing produces over eighty percent of the total multicopter lift one second before landing.

20. The landing method of claim 19, further comprising transitioning a swaying platform from a cruising position to a hovering position;

the swaying platform: a) configured to transition between a cruising configuration and a hovering configuration, b) including a fuselage compartment, a swaying platform arm, and a lifting body surface, and c) located below the airchassis and mechanically connected to the airchassis through at least one lateral axis bearing by the swaying platform arm.

* * * * *